(12) United States Patent
Seo et al.

(10) Patent No.: US 11,765,610 B2
(45) Date of Patent: *Sep. 19, 2023

(54) OPERATING METHOD AT DORMANT BWP IN WIRELESS COMMUNICATION SYSTEM AND TERMINAL USING SAME METHOD

(71) Applicant: LG Electronics Inc., Seoul (KR)

(72) Inventors: Inkwon Seo, Seoul (KR); Joonkui Ahn, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,862

(22) Filed: Jan. 11, 2023

(65) Prior Publication Data

US 2023/0171626 A1  Jun. 1, 2023

Related U.S. Application Data

(63) Continuation of application No. 17/708,788, filed on Mar. 30, 2022, now Pat. No. 11,582,627, which is a
(Continued)

(51) Int. Cl.
*H04W 24/08* (2009.01)
*H04W 72/044* (2023.01)
(Continued)

(52) U.S. Cl.
CPC ......... *H04W 24/08* (2013.01); *H04W 72/044* (2013.01); *H04W 72/1263* (2013.01); *H04W 72/23* (2023.01)

(58) Field of Classification Search
CPC ..... H04L 5/0087; H04L 5/001; H04L 5/0098; H04L 5/0053; H04L 5/0026;
(Continued)

(56) References Cited

U.S. PATENT DOCUMENTS

2018/0242319 A1   8/2018  Akkarakaran et al.
2019/0312635 A1  10/2019  Ang et al.
(Continued)

OTHER PUBLICATIONS

CMCC, "Discussion on fast activation and deactivation of Scell," 3GPP TSG RAN WG1 #98, R1-1908876, Prague, CZ, Aug. 26-30, 2019, 3 pages.
(Continued)

*Primary Examiner* — Chi Ho A Lee
(74) *Attorney, Agent, or Firm* — Fish & Richardson P.C.

(57) ABSTRACT

The present specification relates to a method for receiving dormant bandwidth part (BWP) configuration information, performed by a terminal in a wireless communication system, the method comprising: receiving the dormant BWP configuration information from a base station, wherein the dormant BWP configuration information is information about a downlink BWP used as the dormant BWP among at least one downlink BWP set to the terminal; receiving, from the base station, downlink control information (DCI) notifying activation of the dormant BWP; and stopping monitoring of a physical downlink control channel (PDCCH) on the dormant BWP, wherein a BWP inactivity timer is not used on the basis of the activation of the dormant BWP, and the BWP inactivity timer is a timer for a transition to a default BWP.

12 Claims, 25 Drawing Sheets

Related U.S. Application Data continuation of application No. PCT/KR2020/011771, filed on Sep. 2, 2020.

(60) Provisional application No. 62/910,377, filed on Oct. 3, 2019.

(51) Int. Cl.
  *H04W 72/1263* (2023.01)
  *H04W 72/23* (2023.01)

(58) Field of Classification Search
  CPC .............. H04L 5/0065; H04W 24/08; H04W 52/0235; H04W 72/1263; H04W 72/0453; H04W 76/15; H04W 72/044
  See application file for complete search history.

(56) References Cited

U.S. PATENT DOCUMENTS

| | | |
|---|---|---|
| 2020/0037248 A1 | 1/2020 | Zhou et al. |
| 2020/0382354 A1 | 12/2020 | Sengupta et al. |
| 2021/0050987 A1 | 2/2021 | Hsieh et al. |
| 2021/0051640 A1 | 2/2021 | Pao et al. |
| 2021/0176762 A1 | 6/2021 | Islam et al. |
| 2021/0392651 A1 | 12/2021 | Futaki et al. |
| 2022/0006599 A1* | 1/2022 | Wang .................... H04W 80/02 |
| 2022/0116923 A1 | 4/2022 | Kim et al. |
| 2022/0167358 A1* | 5/2022 | Cheng ................ H04W 72/542 |
| 2022/0174601 A1 | 6/2022 | Chen et al. |
| 2022/0225461 A1* | 7/2022 | Zhang .................. H04W 76/20 |
| 2022/0368468 A1* | 11/2022 | Xiong .................. H04L 1/1854 |

OTHER PUBLICATIONS

Ericsson, "Reduced latency Scell management for NR CA," R1-1909144, Presented at 3GPP TSG-RAN WG1 #98, Prague, Czech Republic, Aug. 26-30, 2019, 7 pages.

Extended European Search Report in European Appln. No. 20871697.7, dated Sep. 16, 2022, 8 pages.

Huawei & HiSilicon, "Discussion on SCell activation and deactivation," R1-1908099, Presented at 3GPP TSG RAN WG1 Meeting #98, Prague, Czech Republic, Aug. 26-30, 2019, 17 pages.

LG Electronics, "Discussion on L1 based Scell dormancy," 3GPP TSG RAN WG1 Meeting #99, R1-1912407, Reno, USA, Nov. 18-22, 2019, 9 pages.

Office Action in Korean Application No. 10-2022-7005060, dated Apr. 25, 2022, 10 pages (with English translation).

Oppo, "Introduction of dormancy behavior in NR," R2-1912285, Presented at 3GPP TSG-RAN WG2 Meeting #107bis, ChongQing, China, Oct. 14-18, 2019, 4 pages.

Qualcomm Incorporated, "Fast SCG and SCell Activation," R1-1909287, Presented at 3GPP TSG-RAN WG1 #98, Prague, Czech Republic, Aug. 26-30, 2019, 11 pages.

Samsung, "On SCell Activation/Deactivation and Dormant Scells," 3GPP TSG RAN WG1 #96, R1-1902253, Athens, Greece, Feb. 25-Mar. 1, 2019, 2 pages.

ZTE Corporation & Sanechips, "On delay reduction of SCell Activation," R2-1910750, Revision of R2-1907097, Presented at 3GPP TSG-RAN WG2 Meeting #107, Prague, Czech Republic, Aug. 26-30, 2019, 6 pages.

* cited by examiner

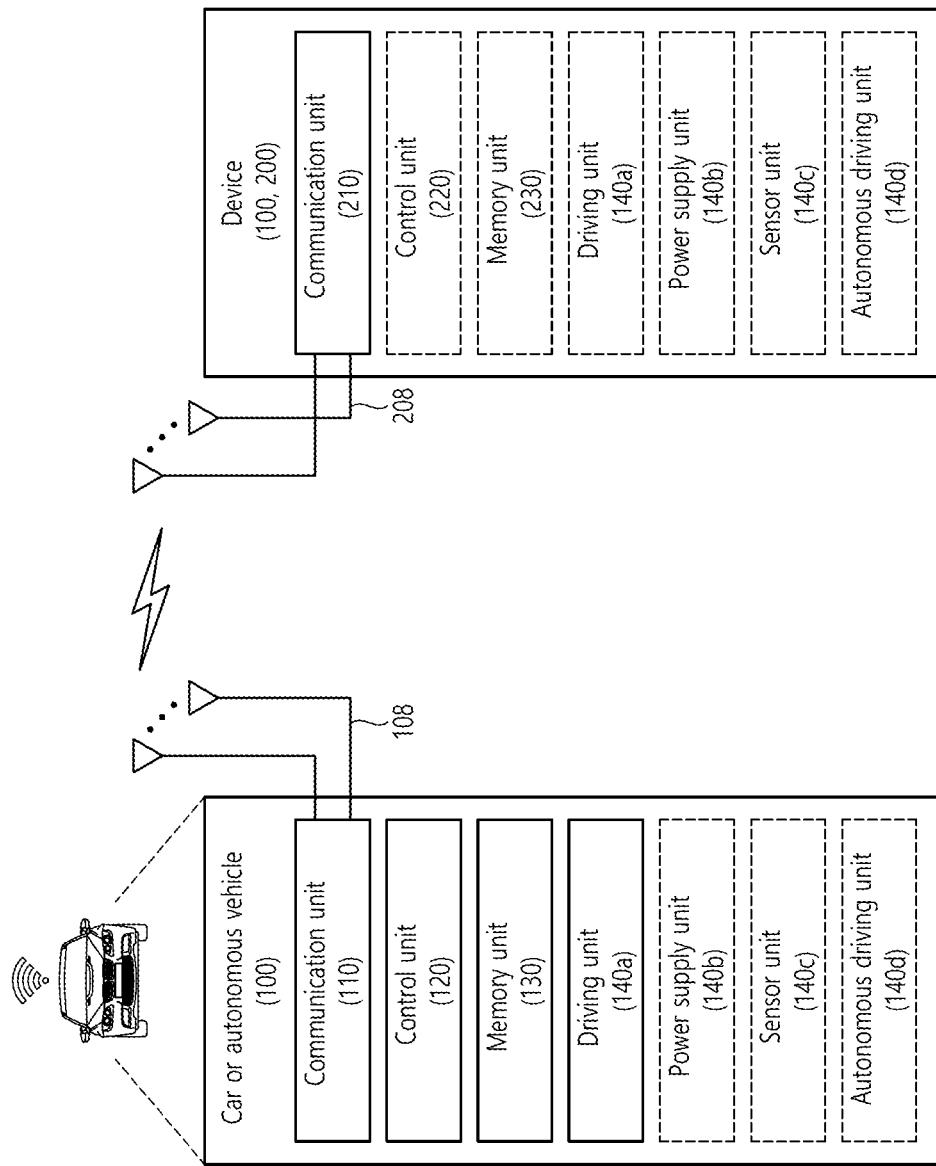

OPERATING METHOD AT DORMANT BWP IN WIRELESS COMMUNICATION SYSTEM AND TERMINAL USING SAME METHOD

CROSS-REFERENCE TO RELATED APPLICATIONS

This application is a continuation of US application Ser. No. 17/708,788, filed on Mar. 30, 2022, which is a continuation pursuant to 35 U.S.C. § 119(e) of International Application PCT/KR2020/011771, with an international filing date of Sep. 2, 2020, which claims the benefit of U.S. Provisional Patent Application No. 62/910,377, filed on Oct. 3, 2019, the contents of which are hereby incorporated by reference herein in their entirety.

BACKGROUND OF THE DISCLOSURE

Field of the Disclosure

The present disclosure relates to wireless communication.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. In the disclosure, for convenience of description, this technology may be referred to as new RAT or new radio (NR).

In the NR system, each serving cell may be configured with a plurality of (e.g., maximum 4) bandwidth parts (BWP). Accordingly, a dormancy operation for each cell and/or BWP needs to be defined.

SUMMARY

According to an embodiment of the present disclosure, there is provided a method, wherein a BWP inactivity timer is not used based on activation of the dormant BWP, and the BWP inactivity timer is a timer for a transition to a default BWP.

According to an embodiment of the present disclosure, when user equipment (UE) is in the dormant BWP, the existing BWP inactivity timer is not used. Accordingly, when the UE is in dormant BWP for power saving, a forcible (unintentional) transition to a default BWP by the UE can be resolved.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

BRIEF DESCRIPTION OF THE DRAWINGS

FIG. 25 illustrates a vehicle or an autonomous driving vehicle applied to the disclosure.

DESCRIPTION OF EXEMPLARY EMBODIMENTS

Figure 1:
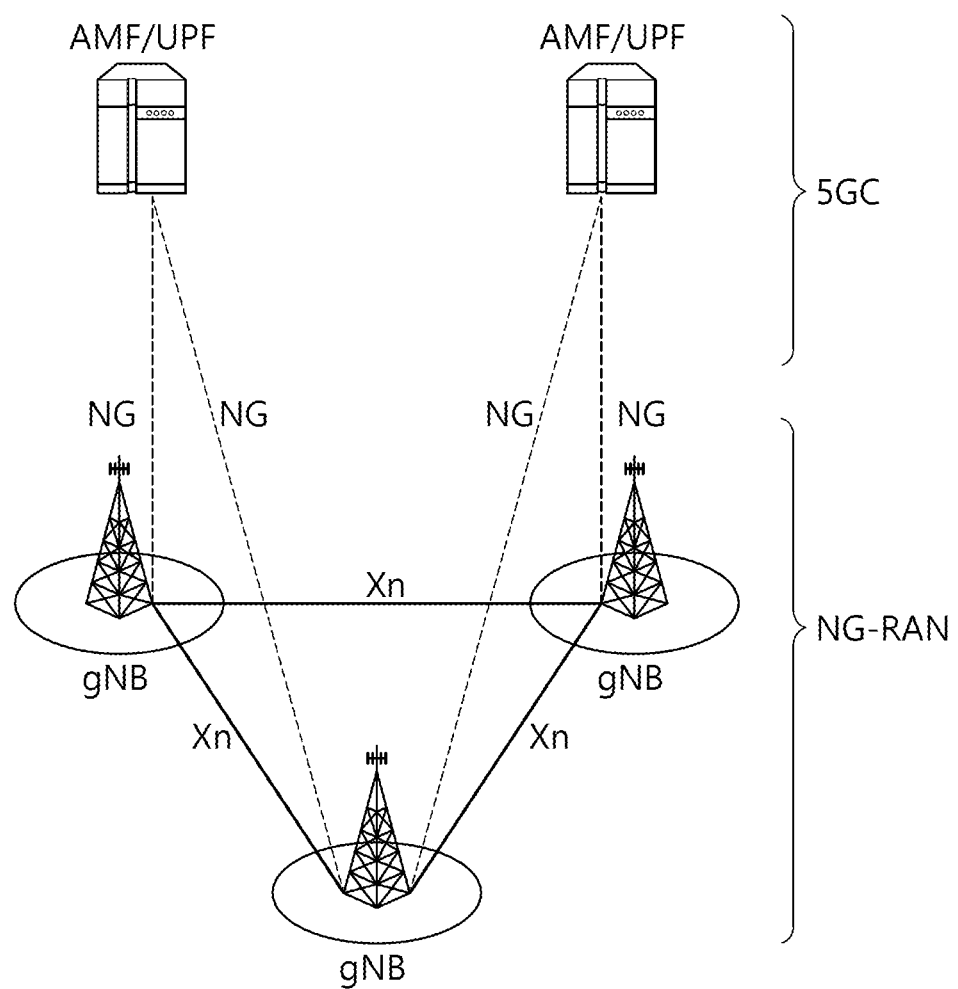
FIG. 1 illustrates a system structure of a next generation radio access network (NG-RAN) to which NR is applied.

As used herein, "A or B" may mean "only A", "only B", or "both A and B". That is, "A or B" may be interpreted as "A and/or B" herein. For example, "A, B or C" may mean "only A", "only B", "only C", or "any combination of A, B. and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A. B, and C". Further, "at least one of A, B, or C" or "at least one of A, B, and/or C" may mean "at least one of A. B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/ latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a terminal. FIG. 1 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 2:
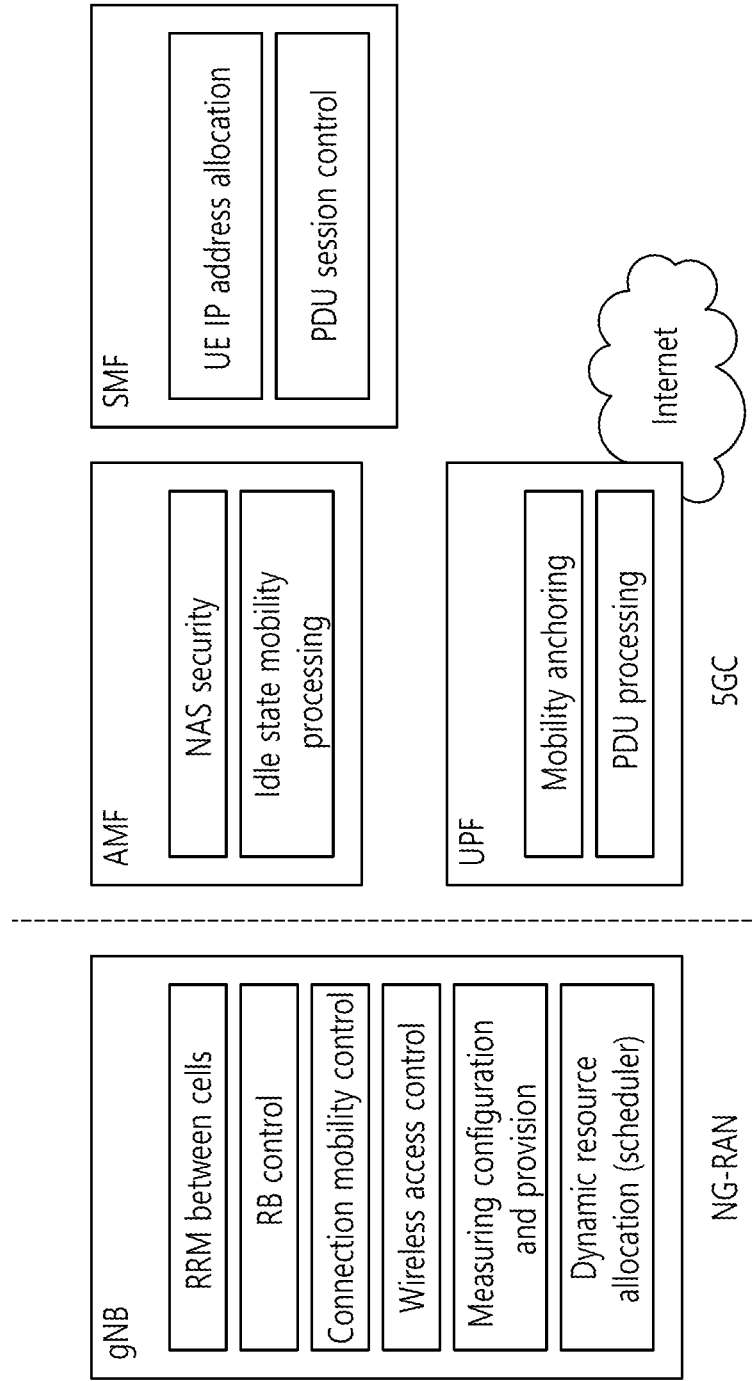
FIG. 2 illustrates a functional division between an NG-RAN and a 5GC.

FIG. 2 illustrates a functional division between an NG-RAN and a 5GC.

Referring to FIG. 2, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring. PDU processing, and the like. The SMF may provide functions such as UE IP address assignment, PDU session control, and so on.

Figure 3:
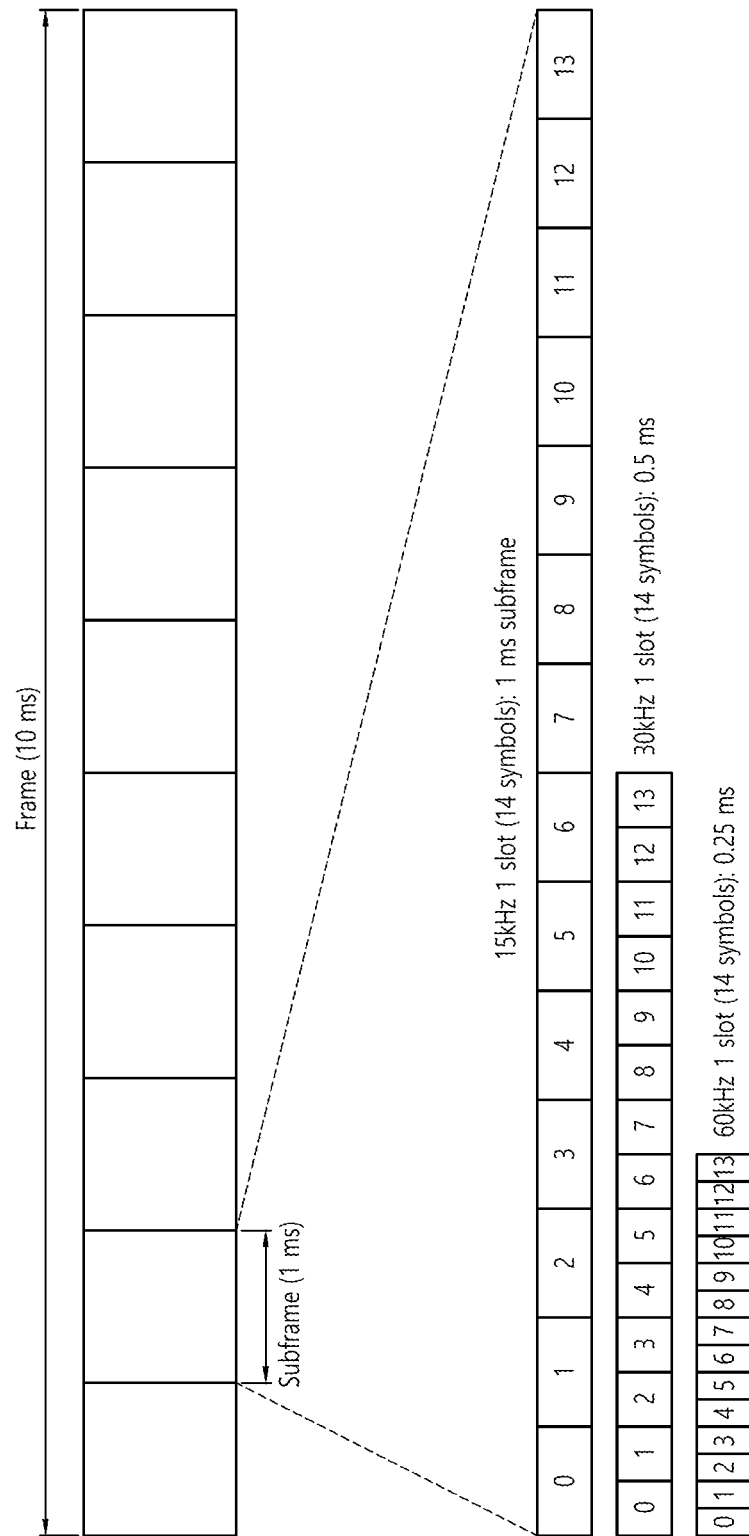
FIG. 3 illustrates a frame structure applicable in NR.

FIG. 3 illustrates a frame structure applicable in NR.

Referring to FIG. 3, a frame may be configured to have a length of 10 millisecond (ms), and may include 10 subframes each having a length of 1 ms.

One or a plurality of slots may be included in the SF according to a subcarrier spacing.

The following table 1 illustrates a subcarrier spacing configuration μ.

TABLE 1

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{sub\text{-}frame,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 3, μ=0, 1, and 2 are exemplified.

A physical downlink control channel (PDCCH) may include one or more control channel elements (CCEs) as illustrated in the following table 3.

TABLE 3

| Aggregation level | Number of CCEs |
| --- | --- |
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain. A new unit called a control resource set (CORESET) may be introduced in the NR. The UE may receive a PDCCH in the CORESET.

Figure 4:
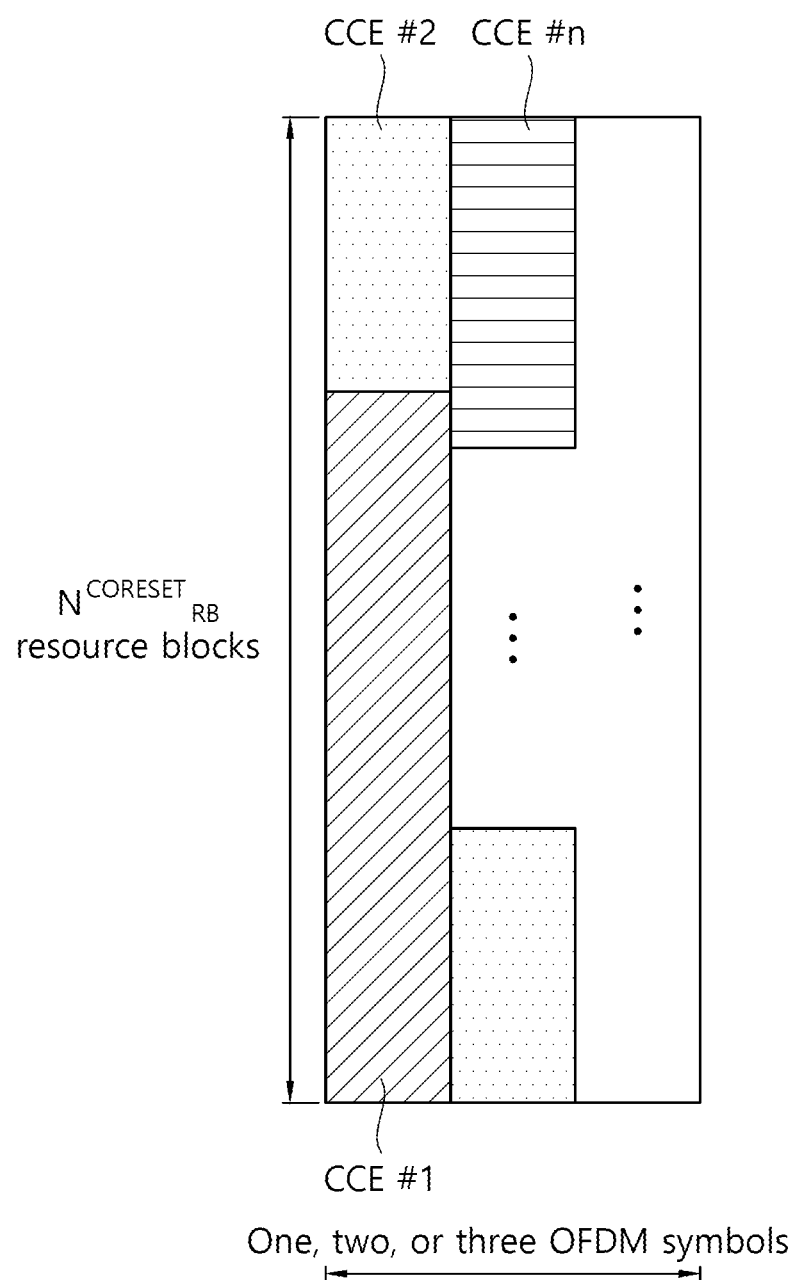
FIG. 4 illustrates CORESET.

FIG. 4 illustrates CORESET.

Referring to FIG. 4, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 4, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 5:
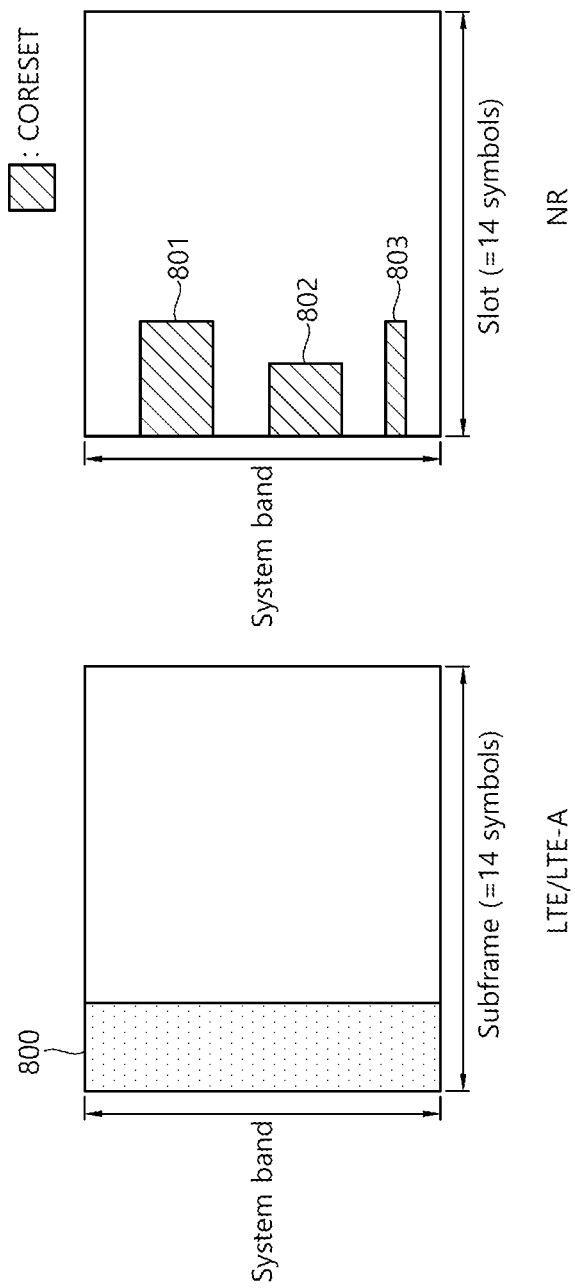
FIG. 5 is a diagram illustrating a difference between a related art control region and the CORESET in NR.

FIG. 5 is a diagram illustrating a difference between a related art control region and the CORESET in NR.

Referring to FIG. 5, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR. CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 5, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.
<Self-Contained Subframe Structure>

Figure 6:
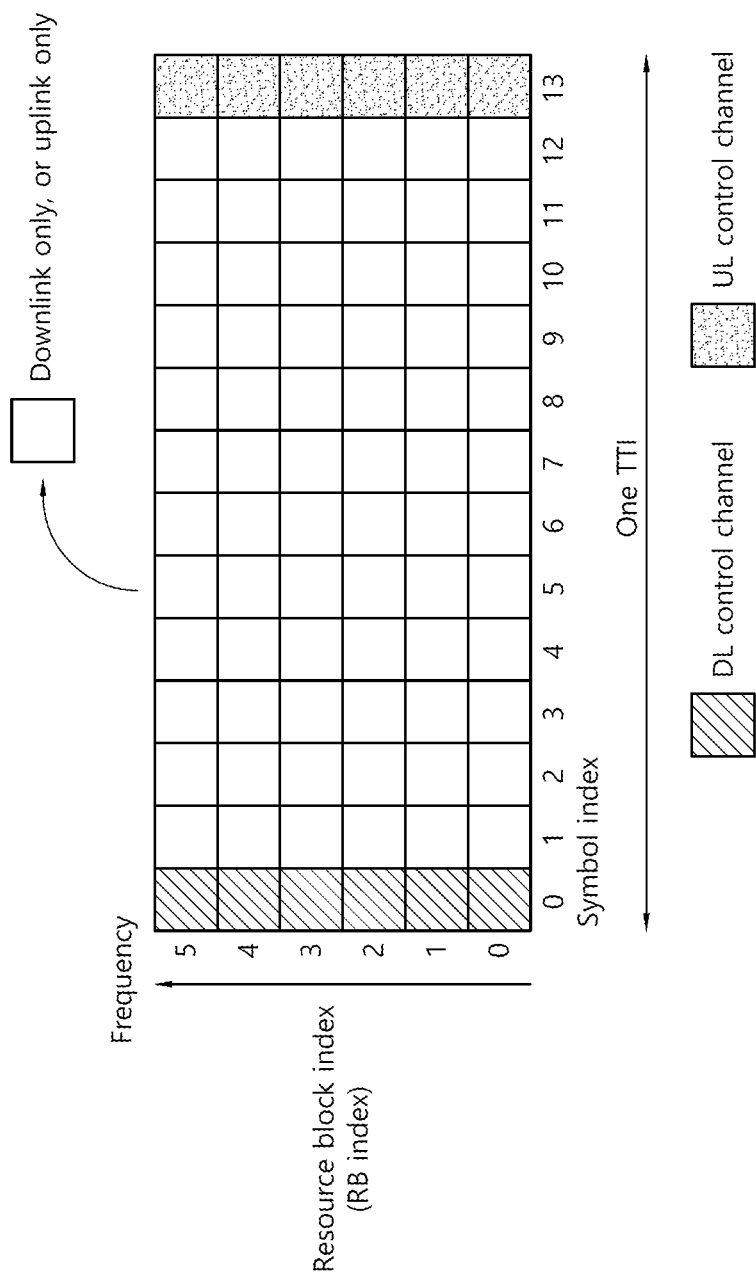
FIG. 6 illustrates an example of a frame structure for new radio access technology.

FIG. 6 illustrates an example of a frame structure for new radio access technology.

In NR, a structure in which a control channel and a data channel are time-division-multiplexed within one TTI, as shown in FIG. 6, can be considered as a frame structure in order to minimize latency.

In FIG. 6, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 7:
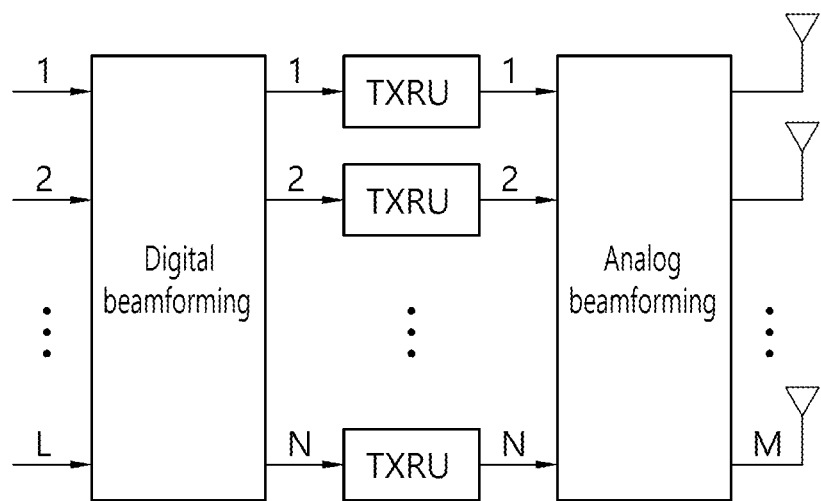
FIG. 7 is an abstract schematic diagram illustrating hybrid beamforming from the viewpoint of TXRUs and physical antennas.

FIG. 7 is an abstract schematic diagram illustrating hybrid beamforming from the viewpoint of TXRUs and physical antennas.

In FIG. 7, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 8:
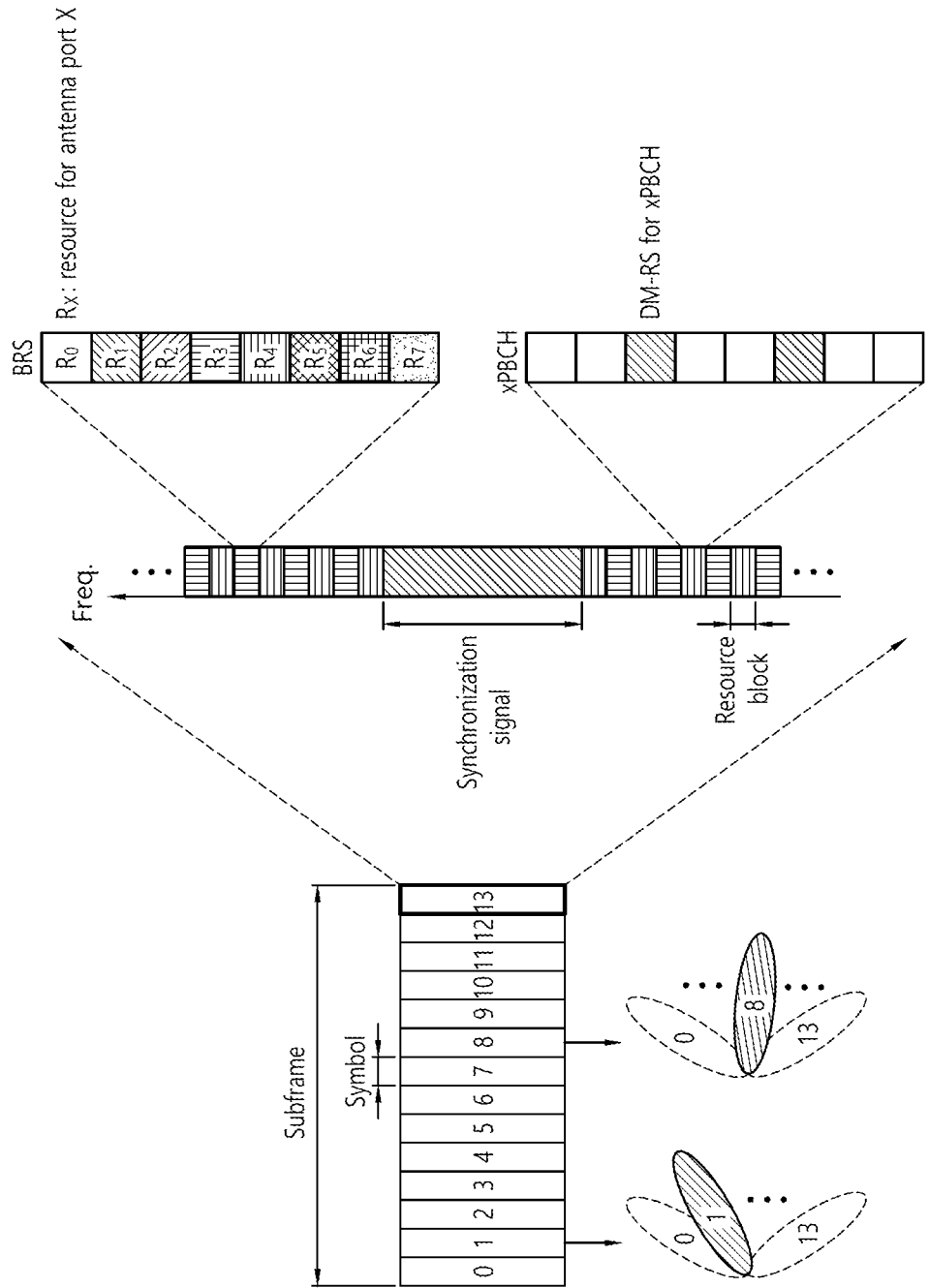
FIG. 8 illustrates the beam sweeping operation for a synchronization signal and system information in a downlink (DL) transmission procedure.

FIG. 8 illustrates the beam sweeping operation for a synchronization signal and system information in a downlink (DL) transmission procedure.

In FIG. 8, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 9:
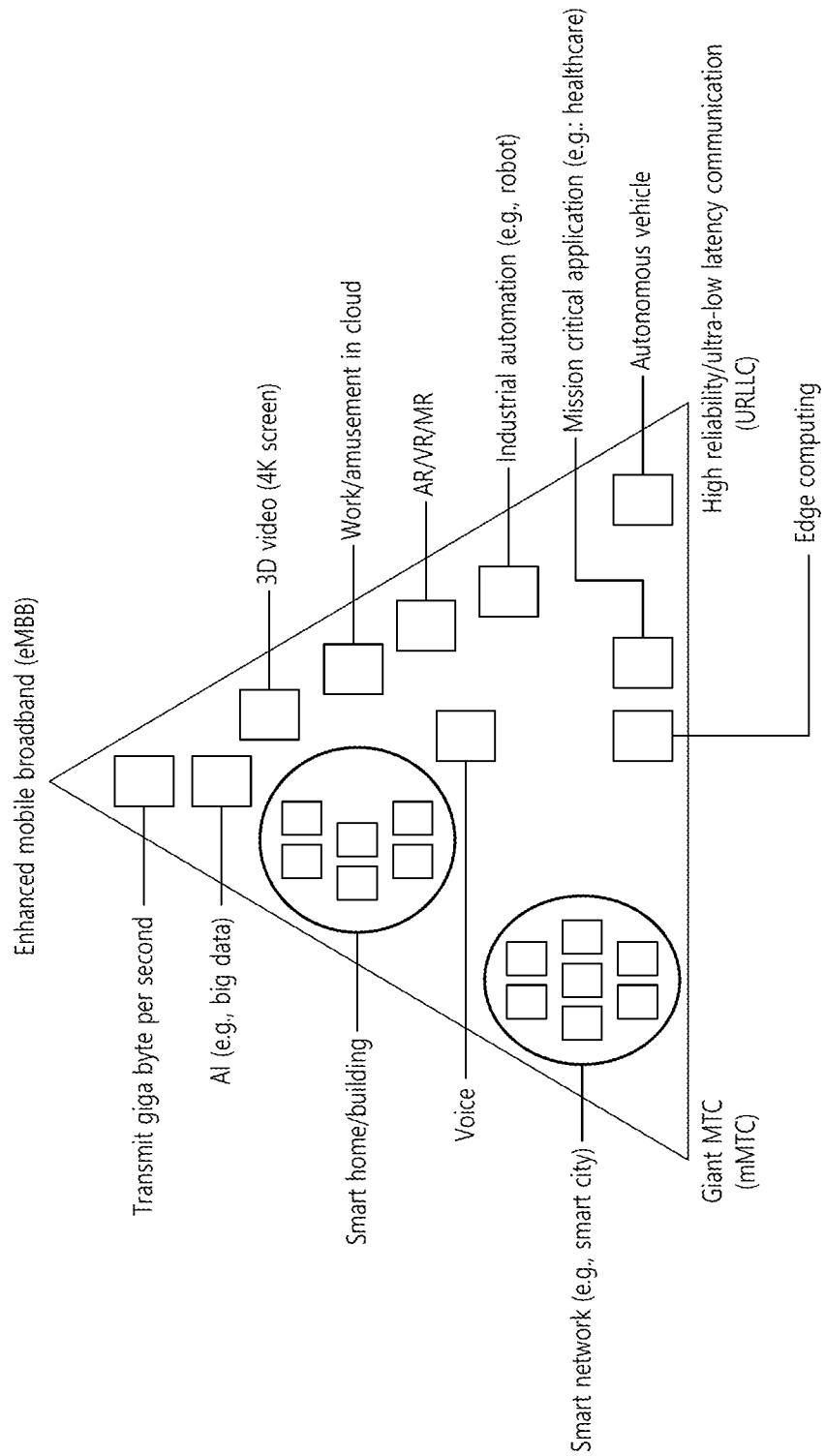
FIG. 9 shows examples of 5G usage scenarios to which the technical features of the present disclosure can be applied.

FIG. 9 shows examples of 5G usage scenarios to which the technical features of the present disclosure can be applied. The 5G usage scenarios shown in FIG. 9 are only exemplary, and the technical features of the present disclosure can be applied to other 5G usage scenarios which are not shown in FIG. 9.

Referring to FIG. 9, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 9 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Hereinafter, a discussion related to power saving will be described.

The UE's battery life is a factor of the user experience that influences the adoption of 5G handsets and/or services. Power efficiency for 5G NR UEs is not worse than at least LTE, and a study of UE power consumption may be provided in order to identify and apply techniques and designs for improvement.

ITU-R defines energy efficiency as one of the minimum technical performance requirements of IMT-2020. According to the ITU-R report, e.g. the minimum requirements related to the technical performance of the IMT-2020 air interface, the energy efficiency of a device can be related to support for two aspects: a) efficient data transmission in the loaded case, b) low energy consumption when there is no data. Efficient data transmission in the loaded case is demonstrated by average spectral efficiency. In the absence of data, low energy consumption can be estimated by the sleep rate.

Since the NR system can support high-speed data transmission, it is expected that user data will burst and be serviced for a very short period of time. One efficient UE power saving mechanism is to trigger the UE for network access from the power efficiency mode. Unless there is information about network access through the UE power saving framework, the UE maintains a power efficiency mode such as a micro-sleep or OFF period within a long DRX period. Instead, when there is no traffic to be transmitted, the network may support the UE to switch from the network access mode to the power saving mode (e.g., dynamic UE switching to sleep with a network support signal).

In addition to minimizing power consumption with a new wake-up/go-to-sleep mechanism, it may be provided to reduce power consumption during network access in the RRC_CONNECTED mode. In LTE, more than half of the power consumption of the UE occurs in the connected mode. Power saving techniques should focus on minimizing the main factors of power consumption during network access, including processing of aggregated bandwidth, dynamic number of RF chains and dynamic transmission/reception time, and dynamic switching to power efficiency mode. In most cases of LTE field TTI, there is no data or there is little data, so a power saving scheme for dynamic adaptation to other data arrivals should be studied in the RRC-CONNECTED mode. Dynamic adaptation to traffic of various dimensions such as a carrier, an antenna, beamforming, and bandwidth can also be studied. Further, it is necessary to consider how to enhance the switching between the network connection mode and the power saving mode. Both network-assisted and UE-assisted approaches should be considered for UE power saving mechanisms.

The UE also consumes a lot of power for RRM measurement. In particular, the UE must turn on the power before the DRX ON period for tracking the channel to prepare for RRM measurement. Some of the RRM measurement is not essential, but consumes a lot of UE power. For example, low mobility UEs do not need to be measured as frequently as high mobility UEs. The network may provide signaling to reduce power consumption for RRM measurement, which is unnecessary for the UE. Additional UE support, for example, UE state information, etc., is also useful for enabling the network to reduce UE power consumption for RRM measurement.

Accordingly, there is a need for research to identify the feasibility and advantages of a technology that enables the implementation of a UE capable of operating while reducing power consumption.

Hereinafter, UE power saving schemes will be described.

For example, the UE power saving techniques may consider a power saving signal/channel/procedure for triggering UE adaptation to traffic and power consumption characteristics, adaptation to frequency changes, adaptation to time changes, adaptation to the antenna, adaptation to the DRX configuration, adaptation to UE processing capabilities, adaptation to obtain PDCCH monitoring/decoding reduction, UE power consumption adaptation, and a reduction in power consumption in RRM measurement.

Regarding adaptation to the DRX configuration, a downlink shared channel (DL-SCH) featuring support for UE discontinuous reception (DRX) for enabling UE power saving. PCH featuring support for UE DRX enabling UE power saving (here, the DRX cycle may be indicated to the UE by the network), and the like may be considered.

Regarding adaptation to the UE processing capability, the following techniques may be considered. When requested by the network, the UE reports at least its static UE radio access capability. The gNB may request the ability of the UE to report based on band information. When allowed by the network, a temporary capability limit request may be sent by the UE to signal the limited availability of some capabilities (e.g., due to hardware sharing, interference, or overheating) to the gNB. Thereafter, the gNB can confirm or reject the request. Temporary capability limitations must be transparent to 5GC. That is, only static functions are stored in 5GC.

Regarding adaptation to obtain PDCCH monitoring/decoding reduction, the following techniques may be considered. The UE monitors the PDCCH candidate set at a monitoring occasion configured in one or more CORESETs configured according to a corresponding search space configuration. CORESET includes a set of PRBs having a time interval of 1 to 3 OFDM symbols. Resource units REG and CCE are defined in CORESET, and each CCE includes a set of REGs. The control channel is formed by a set of CCEs. Different code rates for the control channel are implemented by aggregating different numbers of CCEs. Interleaved and non-interleaved CCE-REG mapping is supported in CORESET.

Regarding the power saving signal/channel/procedure for triggering UE power consumption adaptation, the following technique may be considered. In order to enable reasonable UE battery consumption when carrier aggregation (CA) is configured, an activation/deactivation mechanism of cells is supported. When one cell is deactivated, the UE does not need to receive a corresponding PDCCH or PDSCH, cannot perform a corresponding UL transmission, and does not need to perform a channel quality indicator (CQI) measurement. Conversely, when one cell is activated, the UE must receive the PDCH and PDCCH (when the UE is configured to monitor the PDCCH from this SCell), and is expected to be able to perform CQI measurement. The NG-RAN prevents the SCell of the secondary PUCCH group (the group of SCells in which PUCCH signaling is associated with the PUCCH of the PUCCH SCell) from being activated while the PUCCH SCell (secondary cell composed of PUCCH) is deactivated. The NG-RAN causes the SCell mapped to the PUCCH SCell to be deactivated before the PUCCH SCell is changed or removed.

When reconfiguring without mobility control information, the SCell added to the set of serving cells is initially deactivated, and the (unchanged or reconfigured) SCells remaining in the set of serving cells do not change the activate state (e.g. active or inactive).

SCells are deactivated when reconfiguring with mobility control information (e.g., handover).

In order to enable reasonable battery consumption when BA (bandwidth adaptation) is configured, only one UL BWP and one DL BWP or only one DL/UL BWP pair for each UL carrier may be activated at once in the active serving cell, and all other BWPs configured in the UE are deactivated. In deactivated BWPs, the UE does not monitor the PDCCH and does not transmit on the PUCCH, PRACH and UL-SCH.

For BA, the UE's reception and transmission bandwidth need not be as wide as the cell's bandwidth and can be adjusted: the width can be commanded to change (e.g. shrink during periods of low activity to save power), the position in the frequency domain can be moved (e.g. to increase scheduling flexibility), and the subcarrier spacing can be ordered to change (e.g., to allow different services). A subset of the total cell bandwidth of a cell is referred to as a bandwidth part (BWP), the BA is obtained by configuring the BWP(s) to the UE and knowing that it is currently active among the BWPs configured to the UE. When the BA is configured, the UE only needs to monitor the PDCCH on one active BWP. That is, there is no need to monitor the PDCCH on the entire DL frequency of the cell. The BWP inactive timer (independent of the DRX inactive timer described above) is used to convert the active BWP to the default BWP: the timer is restarted when the PDCCH decoding succeeds, switching to the default BWP occurs when the timer expires.

Figure 10:
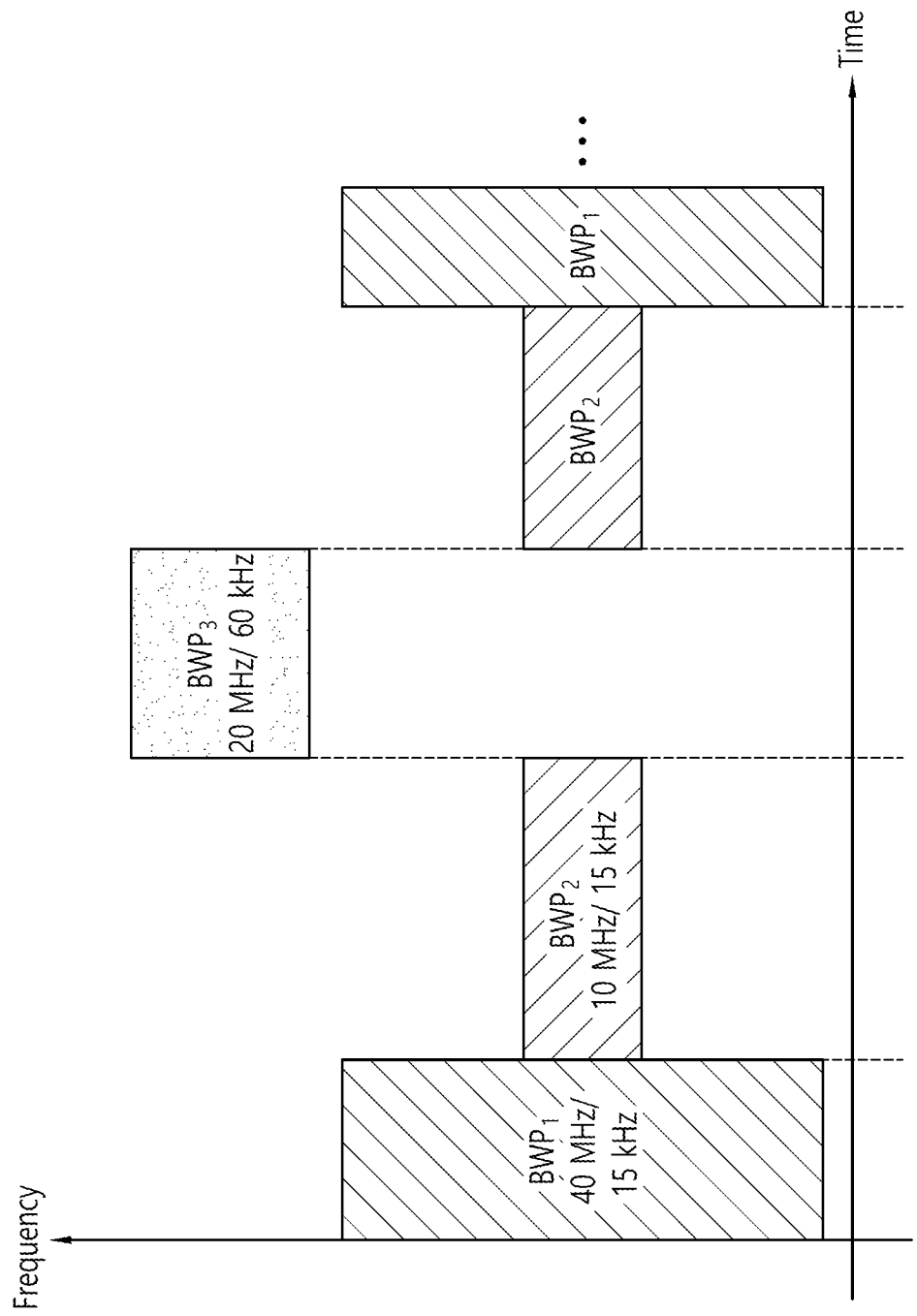
FIG. 10 illustrates a scenario in which three different bandwidth parts are configured.

FIG. 10 illustrates a scenario in which three different bandwidth parts are configured.

FIG. 10 shows an example in which $BWP_1$. $BWP_2$, and $BWP_3$ are configured on time-frequency resources. $BWP_1$ has a width of 40 MHz and a subcarrier spacing of 15 kHz, $BWP_2$ has a width of 10 MHz and a subcarrier spacing of 15 kHz, and $BWP_3$ may have a width of 20 MHz and a subcarrier spacing of 60 kHz. In other words, each of the bandwidth parts may have different widths and/or different subcarrier spacings.

Regarding the power consumption reduction in RRM measurement, the following technique may be considered. When two measurement types are possible, the RRM configuration may include the beam measurement information related to the SSB(s) (for layer 3 mobility) and the CSI-RS(s) for the reported cell(s). In addition, when CA is configured, the RRM configuration may include a list of best cells on each frequency for which measurement information is available. In addition, the RRM measurement information may include beam measurement for listed cells belonging to the target gNB.

The following techniques can be used in various wireless access systems such as CDMA, FDMA, TDMA, OFDMA. SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a wireless technology such as IEEE 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, and Advanced (LTE-A)/LTE-A pro is an evolved version of 3GPP LTE. 3GPP New Radio or New Radio Access Technology (NR) is an evolved version of 3GPP LTE/LTE-A/LTE-A pro.

For clarity, the description is based on a 3GPP communication system (e.g., LTE-A, NR), but the technical idea of the present specification is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. LTE/NR may be referred to as a 3GPP system. "xxx" means standard document detail number. LTE/NR may be collectively referred to as a 3GPP system. Background art, terms, abbreviations, and the like used in the description of the present specification may refer to matters described in standard documents published before the present specification.

Hereinafter, the proposal of the present specification will be described in more detail.

Additional advantages, objects and features of the present specification will be partially described in the following description, it will be apparent to one of ordinary skill in the art or will be able to learn in part from the practice of this specification upon review of the following. Objects and other advantages of the present specification can be realized and achieved by the accompanying drawings, as well as the structures particularly pointed out in the claims and claims of the present specification.

In the NR system, each serving cell may be configured with a plurality of (e.g., maximum 4) bandwidth parts (BWP), and the dormant state in the NR system is considering the operation in units of BWP. Accordingly, a dormancy operation for each cell and/or BWP needs to be defined.

Hereinafter, embodiments of the present specification will be described with reference to the drawings. The following drawings were prepared to explain a specific example of the present specification. Since the names of specific devices described in the drawings or the names of specific signals/messages/fields are presented by way of example, the technical features of the present specification are not limited to the specific names used in the following drawings.

Figure 11:
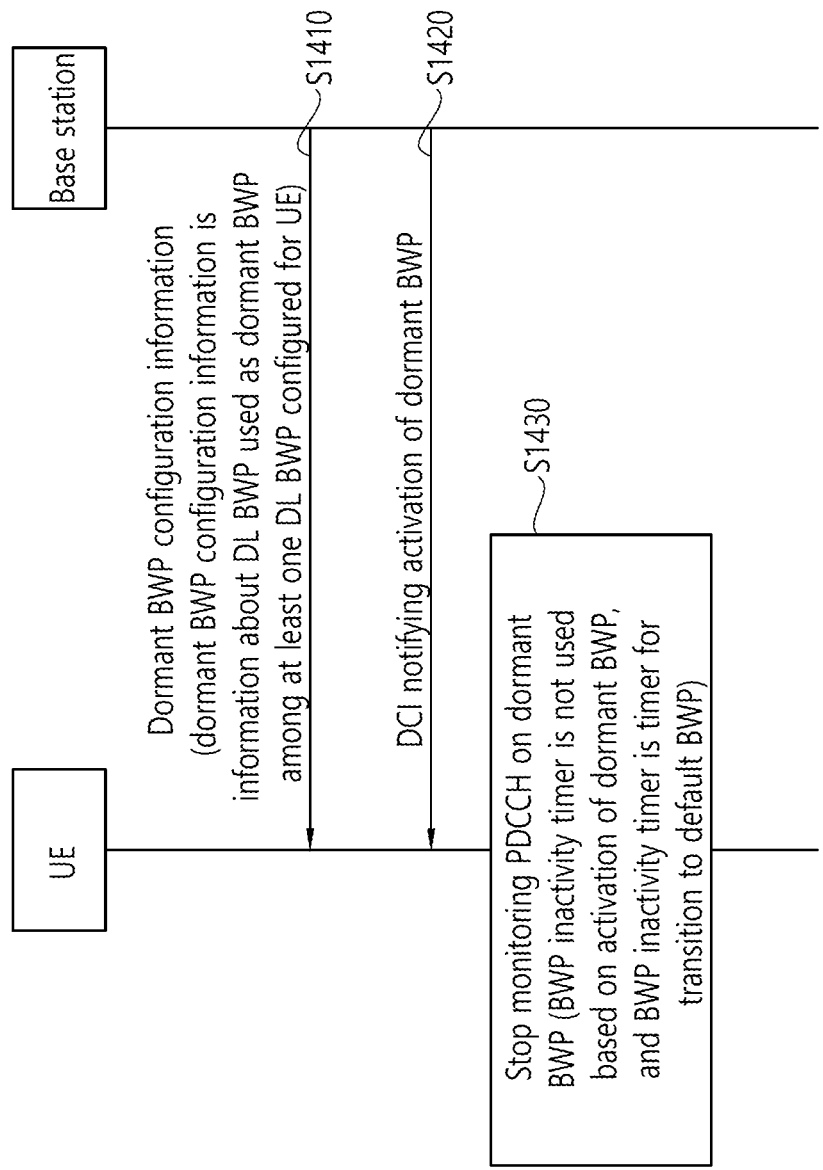
FIG. 11 is a flowchart of a method of receiving dormant BWP configuration information according to an embodiment of the present specification.

FIG. 11 is a flowchart of a method of receiving dormant BWP configuration information according to an embodiment of the present specification.

According to FIG. 11, the UE may receive dormant BWP configuration information from a base station (S1410). Here, the dormant BWP configuration information may be information about a DL BWP used as dormant BWP among at least one DL BWP configured for the UE.

As an example, dormant BWP configuration information received by the UE may be, for example, dormantBWP-Id. Here, the dormant BWP configuration information may include identification information of the DL BWP used as the dormant BWP. In this connection, the identification information of the dormant BWP may be different from the identification information of the default BWP. (In other words, the dormant BWP may be a BWP different from the default BWP.)

In addition, as an example, dormant BWP configuration information received by the UE may be transmitted through higher layer signaling (e.g., RRC signaling).

The UE may receive DCI notifying activation of the dormant BWP from the base station (S1420).

As an example, DCI may include, for example, a bandwidth part indicator field. Here, as an example, the bandwidth part indication field included in the DCI may indicate an active DL BWP among the configured DL BWPs. Since the dormant BWP corresponds to a type of DL BWP, active dormant BWP may also be indicated from the bandwidth part indication field.

In addition, as an example, DCI may correspond to, for example, DCI format 1_1 or DCI format 1_2, and DCI may be transmitted through L1 signaling.

The UE may stop monitoring a PDCCH on the dormant BWP (S1430). Here, the BWP inactivity timer is not used based on the activation of the dormant BWP, and the BWP inactivity timer may be a timer for a transition to a default BWP.

As an example, the UE may receive information about a value of the BWP inactivity timer from a base station. In this connection, the information received by the UE may be, for example, bwp-InactivityTimer.

Herein, for example, when the duration for the value of the BWP inactivity timer elapses, the UE may fall back to the default BWP. In other words, when the BWP inactivity timer expires, the UE may transition from the current BWP to the default BWP.

For example, when the network releases configuration information for the BWP inactivity timer, the UE may stop the timer without a transition to the default BWP.

In this embodiment, as an example, the UE may continue to perform channel state information (CSI) measurement on the dormant BWP. A specific example thereof will be described later (or is as described above), and thus repeated description will be omitted.

For example, the default BWP may be a BWP to which the UE transitions when the BWP inactivity timer expires. A specific example thereof will be described later (or is as described above), and thus repeated description will be omitted.

For example, the dormant BWP may be BWP different from the default BWP. Here, on the basis that the dormant BWP is not the default BWP, the BWP inactivity timer may not be used. A specific example thereof will be described later (or is as described above), and thus repeated description will be omitted.

For example, the dormant BWP may be activated, and based on running of the BWP inactivity timer, the UE may stop the BWP inactivity timer. A specific example thereof will be described later (or is as described above), and thus repeated description will be omitted.

For example, the UE may stop the BWP inactivity timer without a transition to the default BWP based on a release of the BWP inactivity timer. A specific example thereof will be described later (or is as described above), and thus repeated description will be omitted.

For example, the at least one DL BWP may be a DL BWP for a secondary cell (SCell). Here, the at least one BWP may include the dormant BWP. Here, the at least one BWP may include the default BWP. A specific example thereof will be described later (or is as described above), and thus repeated description will be omitted.

Hereinafter, embodiments of the present specification will be described in more detail.

In the LTE system, a dormant state is defined to quickly perform activation/deactivation of a secondary cell (hereinafter, SCell). When a specific SCell is configured to the dormant state, the UE may not perform PDCCH monitoring for the cell. Thereafter, in order to quickly activate the corresponding SCell, it is defined to monitor the channel condition and link status of the corresponding cell by performing measurement, report, etc. in the dormant state. For example, when a specific SCell is configured to the dormant state, the UE does not perform PDCCH monitoring, but may perform measurement and reporting for CSI/RRM.

In the NR system, each serving cell may be configured with a plurality of (e.g., maximum 4) bandwidth parts (BWP), and the dormant state in the NR system is considering the operation in units of BWP. For example, a dormancy operation for each cell and BWP may be defined through the following methods.

Method 1) State Change

The network may indicate a transition to a dormant state for a specific BWP, and the UE may not perform a part or all of the PDCCH monitoring configured in the BWP indicated to transition to the dormant state.

Method 2) Dormant BWP

The network may designate a specific BWP as a dormant BWP. For example, the BWP having a bandwidth of 0 may be configured, the minimum PDCCH monitoring may be indicated through the BWP configuration, or the PDCCH monitoring may not be indicated (by not indicating the SS set configuration).

In summary, in the NR system, a plurality of BWPs may be configured in one cell, and this may also be the case on the SCell. In other words, a plurality of BWPs may be configured in the SCell.

Herein, some of the plurality of BWPs in the SCell may be configured as dormant BWPs, and others may be configured as default BWPs. In this connection, on the dormant BWP, as described above, the UE may stop monitoring the PDCCH. In contrast, on the dormant BWP, when configured, the UE may continue to perform CSI measurement, automatic gain control (AGC), and/or beam management.

Additionally, the NR system considers a transition between a normal state and a dormant state through L1 signaling (e.g., using DCI) for faster SCell activation/deactivation. For example, the dormancy operation of a specific cell may be activated/deactivated through the following methods.

Method 1) Introduction of Special DCI

A special DCI for indicating dormancy behavior of each SCell may be defined. For example, the UE may be indicated to monitor for a special DCI in the PCell, and the network may determine whether each SCell is dormancy through the special DCI. The dormancy behavior of the SCell may be defined using the above method 1 or 2, etc.

Method 2) Enhancement of BWP Indication Field in DCI

It is possible to extend a BWP indication field of the existing DCI to perform the BWP indication of the corresponding cell and/or a specific SCell(s) (that is, performing a cross-carrier indication for BWP in the existing BWP indication field).

Method 3) BWP Level Cross-Carrier Scheduling

The existing cross-carrier scheduling performs inter-carrier pairing in such a way that each cell indicates whether the corresponding cell is a scheduling/scheduled cell, and in the case of a scheduled cell, each cell indicates a scheduling cell of the corresponding cell. In order to define dormancy behavior for the SCell, a method of indicating whether cross-carrier scheduling for each BWP may be considered. For example, in each BWP configuration of the SCell, a scheduling cell that may be indicated to change a state, etc. when the corresponding BWP performs dormancy behavior may be designated. Alternatively, when a dormant BWP is designated, a scheduling cell indicating the dormancy behavior of the corresponding BWP in the corresponding BWP configuration may be designated.

In summary, in the NR system, a method of using DCI for dormant activation/deactivation operation may be provided. In this connection, a dormant BWP among a plurality of BWPs on the SCell may be activated/deactivated through DCI.

As stated above, various methods are being discussed to implement SCell fast activation/deactivation and dormancy behavior in NR. When the above methods are used, additional considerations may be as follows.

Issue 1) Default BWP triggered by BWP inactivity timer
Issue 2) Scheduling information within a DCI triggering dormancy behavior
Issue 3) HARQ feedback of a DCI triggering dormancy behavior Each issue and solution are discussed below.

In the present specification, D-BWP may mean a BWP performing dormancy behavior, and N-BWP may mean a BWP performing an existing BWP operation as a normal BWP. In addition, in the present disclosure, dormant behavior in a certain BWP does not receive PDCCH in the corresponding BWP or receives it at a longer period than normal behavior, or does not receive PDSCH/PUSCH scheduling for the corresponding BWP, or it may mean that it is received in a longer period than normal behavior. Similarly, the dormant BWP may mean not receiving PDCCH in the corresponding BWP or receiving it at a longer period than normal BWP, or receiving no PDSCH/PUSCH scheduling for the corresponding BWP or receiving it at a longer period than normal BWP.

Figure 12:
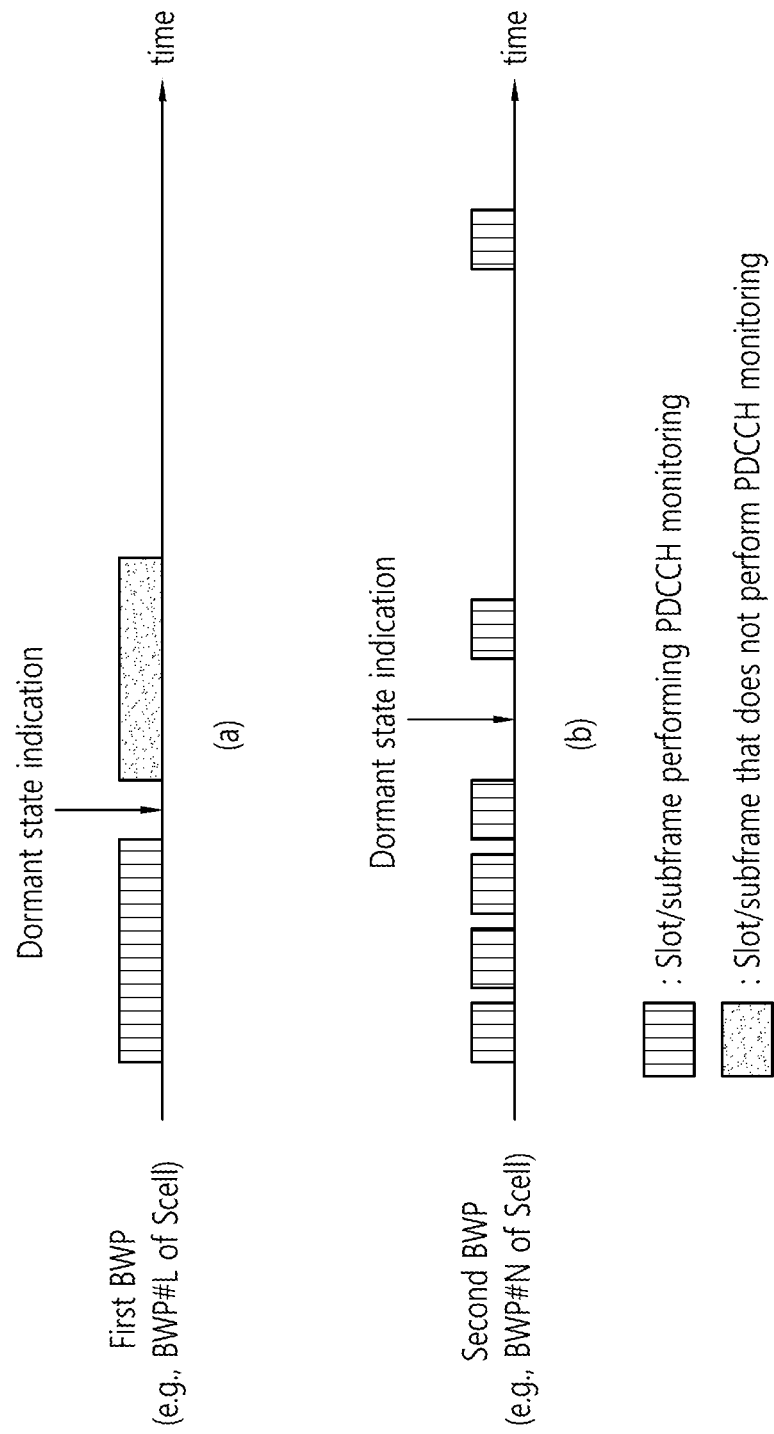
FIG. 12 illustrates dormant behavior.

FIG. 12 illustrates dormant behavior.

As exemplified in FIG. 12(A), the UE may not perform PDCCH monitoring thereafter when receiving a dormant state indication while performing PDCCH monitoring in the first BWP. Alternatively, as exemplified in FIG. 12(B), while performing PDCCH monitoring in a first period in the second BWP, when a dormant state is indicated, thereafter, PDCCH monitoring may be performed in a second period. In this connection, the second period may be longer than the first period.

<Default BWP Triggered by BWP Inactivity Timer>

Figure 13:
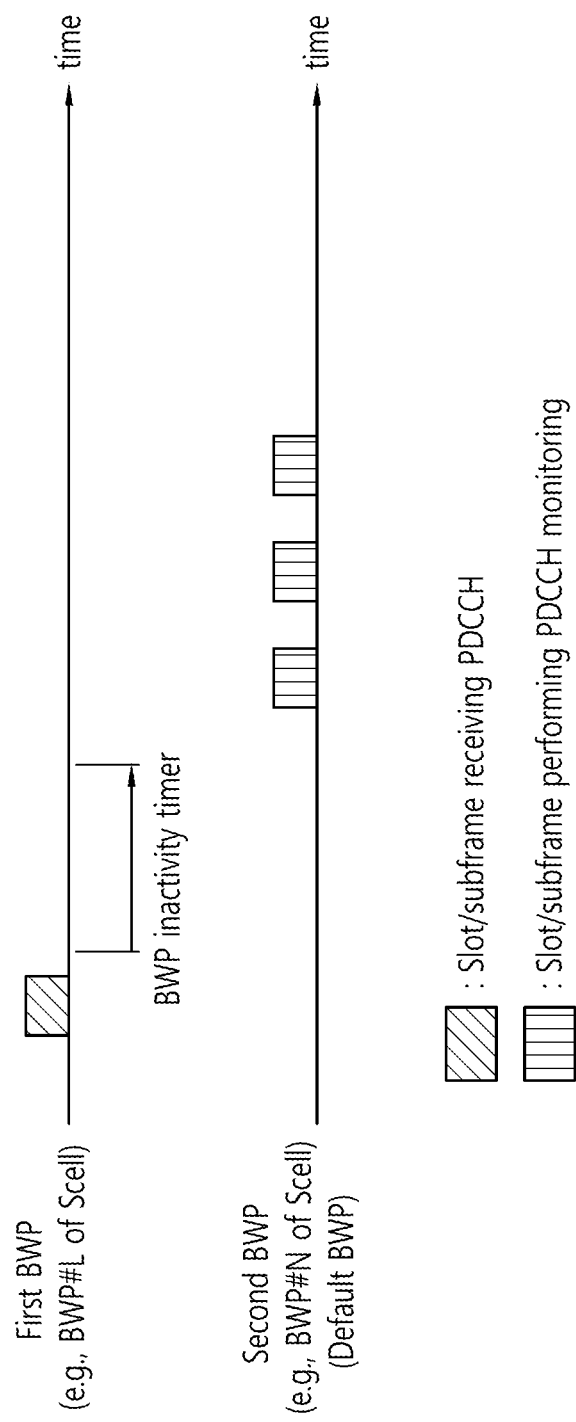
FIG. 13 illustrates an example of the BWP operation of the UE.

FIG. 13 illustrates an example of the BWP operation of the UE.

In the BWP operation of Rel-15, a BWP inactivity timer was introduced to prevent the case of configuring different active BWPs due to misunderstanding between the UE and the network. When the UE does not receive the PDCCH for more than a specific time (specified by the timer) in the active BWP, it may move to the default BWP indicated in advance by the network, and PDCCH monitoring in the default BWP may be performed according to the configured PDCCH monitoring configuration (e.g., CORESET. SS set configuration) for the default BWP. This operation is exemplified in FIG. 13.

When such a default BWP operation and dormancy behavior are performed together, an operation contrary to each purpose may be performed. For example, the network may indicate a specific SCell to move to D-BWP for power saving of the UE, or to change the current BWP to a dormant state. However, the UE that has configured for a BWP inactivity timer may move to the default BWP after a certain period of time to perform PDCCH monitoring.

A simple way to solve this is to consider a method of configuring the default BWP to D-BWP. However, in this case, an additional method is required to solve misunderstanding between the network and the UE, which is the original purpose of the default BWP.

In this regard, the present specification proposes the following method to apply dormancy behavior and BWP inactivity timer together.

When the network indicates the movement to D-BWP, or the current active BWP is switched to the dormant state, the UE ignores the presently configured BWP inactivity timer, or the inactivity timer may be reset as a predefined value or a value indicated by the network (for dormancy behavior).

In summary, according to an embodiment of the present specification, the active dormant BWP and the default BWP may be different BWPs. In addition, when the active dormant BWP is not the default BWP, the BWP inactivity timer may not be used based on the activation of the dormant BWP. In other words, when the active dormant BWP is not the default BWP (even when it is desirable for the UE to be in the dormant BWP for power saving, to prevent the inefficiency of forcibly transitioning to the default BWP by the BWP inactivity timer), based on the activation of the dormant BWP, the BWP inactivity timer, which is a timer for a transition to a default BWP, may not be used.

In addition, as described above, the dormant BWP and the default BWP may be BWPs on the SCell. From this viewpoint, the above description is once again explained as follows. When the active DL BWP indicated (or provided) as dormant BWP for a UE on an activated SCell is not a default BWP for the UE on the activated SCell, the BWP inactivity timer may not be used for a transition from the active DL BWP indicated (or provided) as the dormant BWP to the default DL BWP on the activated SCell.

For example, the network may configure an appropriate dormancy section in consideration of the UE's traffic situation, etc., and may indicate the UE (m advance) of the corresponding value. Thereafter, when the UE is indicated to move to the D-BWP or is indicated to switch the current active BWP to the dormant state, the UE may configure the value indicated by the network as the BWP inactivity timer value. In addition, the inactivity timer for dormancy behavior indicated by the network may operate independently of the existing BWP inactivity timer. For example, the UE indicated for the dormancy behavior may turn off the existing BWP inactivity timer and operate the inactivity timer for the dormancy behavior. Thereafter, when the BWP inactivity timer is terminated or the UE is indicated to move to the N-BWP (or switching to the normal state), the dormancy behavior may be terminated.

Figure 14:
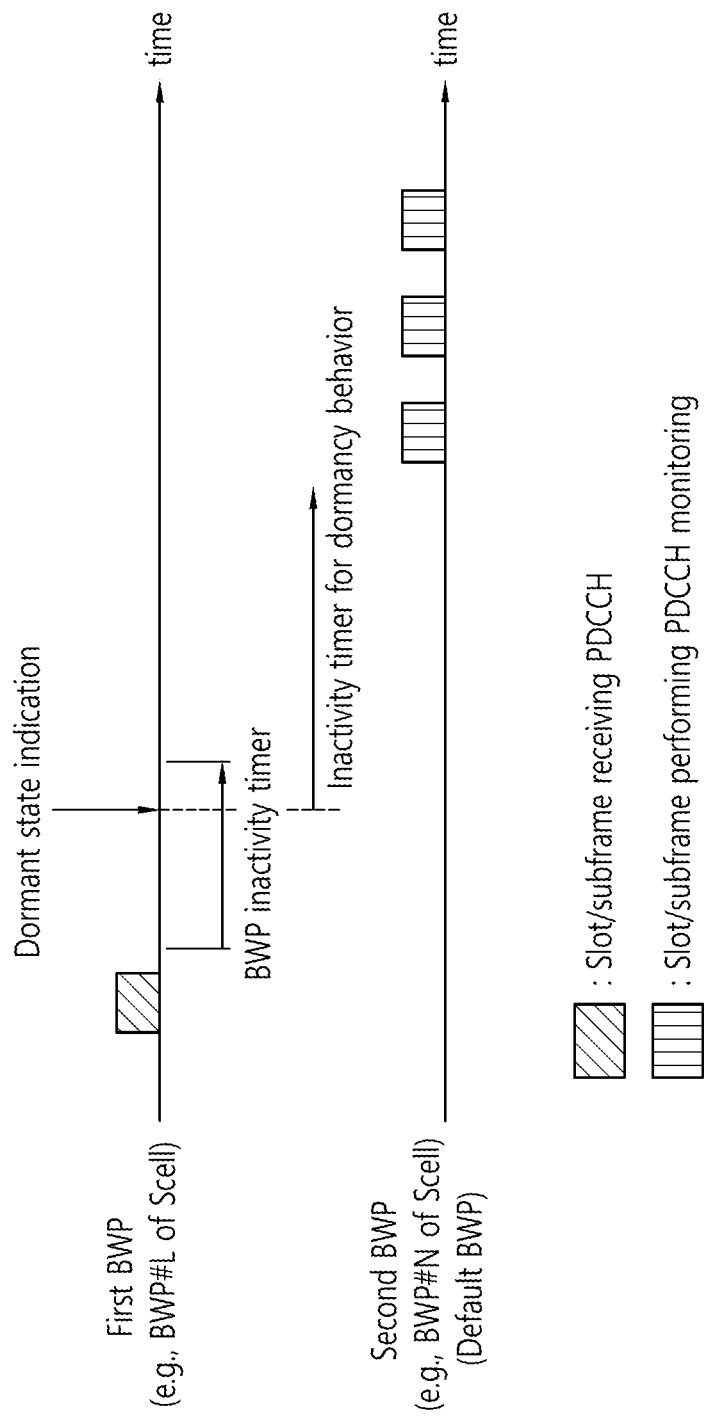
FIG. 14 illustrates another example of the BWP operation of the UE.

FIG. 14 illustrates another example of the BWP operation of the UE.

In addition, when the dormancy behavior is terminated by the inactivity timer for the dormancy behavior, the UE may move to the default BWP of the corresponding cell or switch to a normal state. Alternatively, when the network terminates dormancy behavior by the inactivity timer, the UE may designate and indicate the BWP to move. This operation is illustrated in FIG. 14.

<Scheduling Information within a DCI Triggering Dormancy Behavior>

When the movement between D-BWP/N-BWP is indicated by DCI, and the corresponding DCI is a general scheduling DCI, a problem may occur when it is not clear whether the scheduling information in the DCI operates. For example, when performing an operation for PDSCH scheduling in DCI indicating movement to D-BWP, additional operation may be required depending on whether the reception of the corresponding PDSCH is successful. This may mean that the PDCCH/PDSCH transmission/reception operation may continue even in the D-BWP. In order to solve such a problem, the present disclosure proposes the following method.

Case 1) When PDSCH scheduling information exists in DCI indicating dormancy behavior for a specific cell (or DCI indicating switching to dormant BWP)

As described above, since PDSCH transmission/reception in D-BWP may cause additional PDCCH/PDSCH transmission/reception, an operation contrary to the purpose of dormant BWP may be performed. Accordingly, PDSCH scheduling information for D-BWP included in DCI indicating dormancy behavior may be ignored. In addition, the decoding performance of the UE may be improved by transmitting a known bit (sequence) to the corresponding field. For this purpose, known bit information for (the field related to PDSCH scheduling) may be indicated by the network or through previous definition.

Case 2) When PDSCH scheduling (or UL scheduling) information exists in DCI (or DCI indicating switching from dormant BWP to normal BWP) indicating the switching from dormancy behavior to normal behavior In the case of case 2, since PDSCH scheduling information (or UL scheduling information) may reduce PDCCH transmission in N-BWP or in a normal state, it may be desirable to apply PDSCH scheduling information. However, case 2 may determine whether PDSCH scheduling information (or UL scheduling information) is applied while being limited to the case of UL/DL scheduling related information in the N-BWP to which the corresponding PDSCH scheduling information (or UL scheduling information) is switched or PDSCH (or UL transmission) related information in the normal state. For example, when a field indicating dormancy behavior for a specific SCell(s) is added to DCI for scheduling PDSCH of PCell, the PDSCH scheduling information of the corresponding DCI may also mean PDSCH-related information in the PCell.

<HARQ Feedback of a DCI Triggering Dormancy Behavior>

Since the dormancy behavior may limit the PDCCH/PDSCH transmission/reception operation in the indicated cell as much as possible (according to the definition), subsequent operations of the network and the UE may be greatly affected by missing/false alarms, etc. In order to solve this problem, a method of improving decoding performance may be applied or an additional identification operation for the dormancy behavior indication may be required. In order to solve this problem, the present specification proposes to perform ACK/NACK feedback for the movement to the D-BWP or the switching to the dormant state.

To this end, the following method may be considered. The options below may be implemented alone or in combination. In the following, when DCI is configured only with an indication of dormancy behavior (since the UE may not determine whether NACK is present), the following proposal may be interpreted as transmitting ACK signaling. Alternatively, when DCI indicating dormancy behavior also includes PDSCH scheduling, it may mean that ACK/NACK (uplink transmission in case of uplink scheduling) for the corresponding PDSCH has received a command for dormancy behavior. (In other words, since both ACK and NACK may mean that DCI reception is normally received, both ACK/NACK may mean that an indication for dormancy behavior has been received.)

Case 1) Dormancy Command+UL/DL Scheduling

DCI indicating dormancy behavior may include UL/DL scheduling information, and scheduled UL transmission and ACK/NACK for DL may mean that DCI including dormancy behavior has been properly received, and thus the UE and the network may assume that the indicated dormancy behavior is performed. (Herein, since NACK means NACK for PDSCH reception, NACK may also mean that an indication for dormancy behavior has been received.)

Case 1-1) When the target of UL/DL scheduling is dormancy BWP (or dormant state)

It may be assumed that the UE may perform dormancy behavior after termination of the scheduled UL/DL scheduling, and it may be assumed that the ACK/NACK resource (or UL resource) for the corresponding scheduling in D-BWP (or dormant state) follows the existing ACK/NACK resource determination method and UL transmission method. After terminating the corresponding UU/DL transmission/reception, the UE may perform dormancy behavior, and may assume that there is no scheduling thereafter or ignore it.

Case 1-2) When the target of UL/DL scheduling is scheduling cell/BWP (or normal state)

In this case, ACK/NACK or UL transmission in the scheduling cell/BWP (or normal state) may mean that the dormancy command is normally received, and the UE may perform dormancy behavior.

Case 2) dormancy command+non-scheduling/fake-scheduling

Case 2 is a case in which dormancy behavior is indicated by DCI (or DCI that may assume the scheduling information field as a dummy) in which only the command for dormancy behavior is valid without UL/DL scheduling information. In this case, because there is no associated UL/DL transmission/reception, feedback information about DCI (when DCI is not received, the UE does not know whether DCI is transmitted, so it may actually mean ACK transmission) may be transmitted. In this case, feedback for the dormancy command is transmitted in the dormancy BWP (or dormant state), and the feedback resource is indicated together by DCI for transmitting the dormancy command, or feedback may be performed through a predefined feedback resource.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

When the contents of the above-described embodiments are described from a different perspective, they may be as follows.

The following drawings were prepared to explain a specific example of the present specification. Since the names of specific devices described in the drawings or the names of specific signals/messages/fields are presented by way of example, the technical features of the present specification are not limited to the specific names used in the following drawings.

Figure 15:
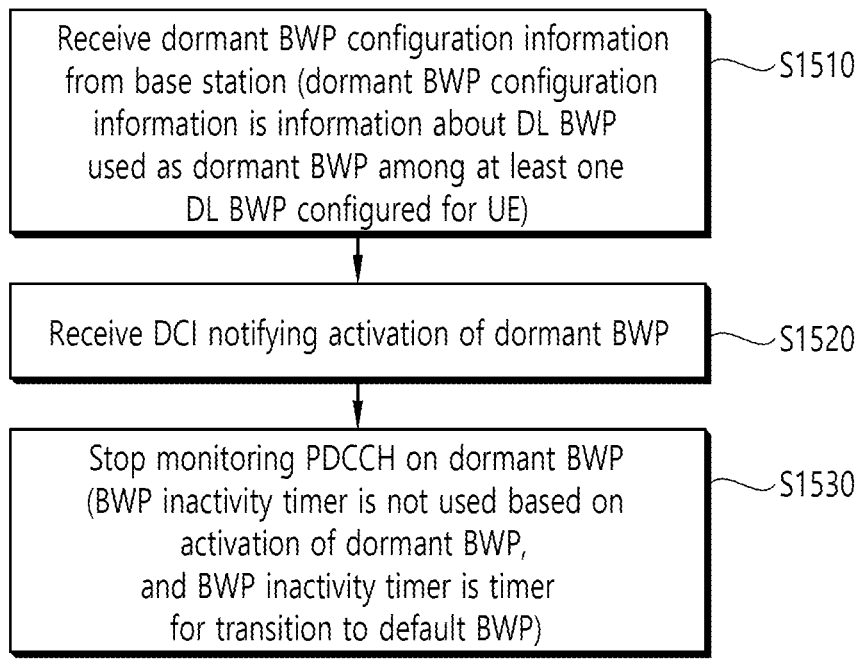
FIG. 15 is a flowchart of a method of receiving dormant BWP configuration information from the viewpoint of a UE according to an embodiment of the present specification.

FIG. 15 is a flowchart of a method of receiving dormant BWP configuration information from the viewpoint of a UE according to an embodiment of the present specification.

According to FIG. 15, the UE may receive dormant BWP configuration information from a base station (S1510). Here, the dormant BWP configuration information may be information about a DL BWP used as dormant BWP among at least one DL BWP configured for the UE. Since specific examples of the above embodiments are the same as described above, in order to avoid unnecessary repetition, descriptions of overlapping contents will be omitted.

The UE may receive downlink control information (DCI) notifying activation of the dormant BWP from the base station (S1520). Since specific examples of the above embodiments are the same as described above, in order to avoid unnecessary repetition, descriptions of overlapping contents will be omitted.

The UE may stop monitoring a physical downlink control channel (PDCCH) on the dormant BWP (S1530). Here, the BWP inactivity timer is not used based on the activation of the dormant BWP, and the BWP inactivity timer may be a timer for a transition to a default BWP. Since specific examples of the above embodiments are the same as described above, in order to avoid unnecessary repetition, descriptions of overlapping contents will be omitted.

Figure 16:
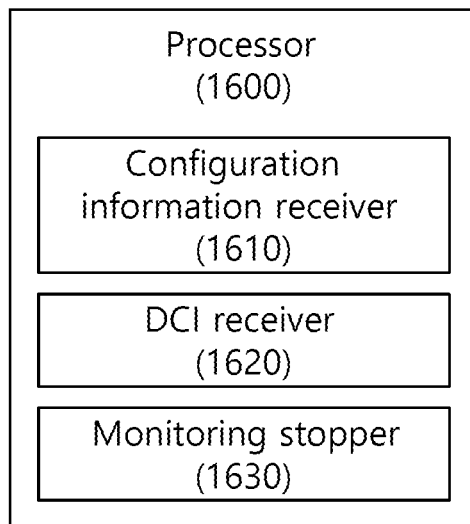
FIG. 16 is a block diagram of an example of an apparatus for receiving dormant BWP configuration information from the viewpoint of a UE according to an embodiment of the present specification.

FIG. 16 is a block diagram of an example of an apparatus for receiving dormant BWP configuration information from the viewpoint of a UE according to an embodiment of the present specification.

According to FIG. 16, the processor 1600 may include a configuration information receiver 1610, a downlink control information (DCI) receiver 1620, and a monitoring stopper 1630. Here, the processor 1600 may correspond to the processor to be described later (or described above).

The configuration information receiver 1610 may be configured to control the transceiver to receive dormant BWP configuration information from a base station. Here, the dormant BWP configuration information may be information about a DL BWP used as dormant BWP among at least one DL BWP configured for the UE. Since specific examples of the above embodiments are the same as described above, in order to avoid unnecessary repetition, descriptions of overlapping contents will be omitted.

The DCI receiver 1620 may be configured to control the transceiver to receive DCI notifying activation of the dormant BWP from the base station. Since specific examples of the above embodiments are the same as described above, in order to avoid unnecessary repetition, descriptions of overlapping contents will be omitted.

The monitoring stopper 1630 may be configured to stop monitoring a PDCCH on the dormant BWP. Here, the BWP inactivity timer is not used based on the activation of the dormant BWP, and the BWP inactivity timer may be a timer for a transition to a default BWP. Since specific examples of the above embodiments are the same as described above, in order to avoid unnecessary repetition, descriptions of overlapping contents will be omitted.

Although not illustrated separately, the embodiments of the present specification also provide the following embodiments.

According to an embodiment, an apparatus includes at least one memory and at least one processor being operatively connected to the at least one memory, wherein the processor is configured to: control a transceiver to receive, from a base station, dormant BWP configuration information, wherein the dormant BWP configuration information is information about a DL BWP used as dormant BWP among at least one DL BWP configured for the UE; control the transceiver to receive, from the base station, DCI notifying activation of the dormant BWP; and stop monitoring of a PDCCH on the dormant BWP, wherein a BWP inactivity timer is not used based on the activation of the dormant BWP, and the BWP inactivity timer is a timer for a transition to a default BWP.

According to another embodiment, at least one computer readable medium includes instructions being executed by at least one processor, the at least one processor is configured to: control a transceiver to receive, from a base station, dormant BWP configuration information, wherein the dormant BWP configuration information is information about a DL BWP used as dormant BWP among at least one DL BWP configured for the UE: control the transceiver to receive, from the base station, DCI notifying activation of the dormant BWP; and stop monitoring of a PDCCH on the dormant BWP, wherein a BWP inactivity timer is not used based on the activation of the dormant BWP, and the BWP inactivity timer is a timer for a transition to a default BWP.

Figure 17:
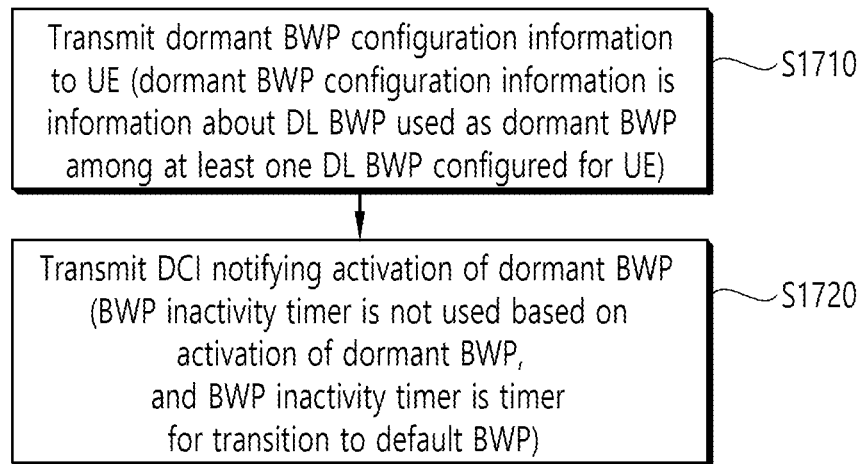
FIG. 17 is a flowchart of a method of transmitting dormant BWP configuration information from the viewpoint of a UE according to an embodiment of the present specification.

FIG. 17 is a flowchart of a method of transmitting dormant BWP configuration information from the viewpoint of a UE according to an embodiment of the present specification.

According to FIG. 17, the base station may transmit the dormant BWP configuration information to a UE (S1710). Here, the dormant BWP configuration information may be information about a DL BWP used as dormant BWP among at least one DL BWP configured for the UE. Since specific examples of the above embodiments are the same as described above, in order to avoid unnecessary repetition, descriptions of overlapping contents will be omitted.

The base station may transmit DCI notifying activation of the dormant BWP to the UE (S1720). Here, the BWP inactivity timer is not used based on the activation of the dormant BWP, and the BWP inactivity timer may be a timer for a transition to a default BWP. Since specific examples of the above embodiments are the same as described above, in order to avoid unnecessary repetition, descriptions of overlapping contents will be omitted.

Figure 18:
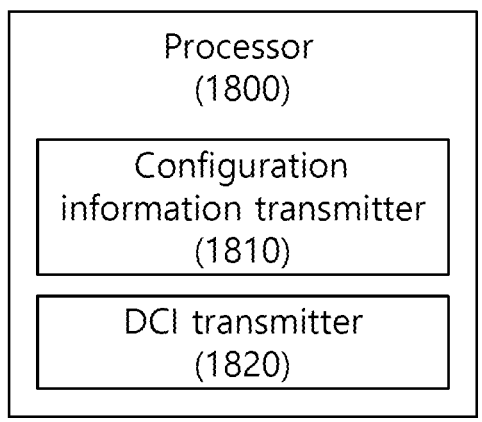
FIG. 18 is a block diagram of an example of an apparatus for transmitting dormant BWP configuration information from the viewpoint of a base station according to an embodiment of the present specification.

FIG. 18 is a block diagram of an example of an apparatus for transmitting dormant BWP configuration information from the viewpoint of a base station according to an embodiment of the present specification.

According to FIG. 18, the processor 1800 may include a configuration information transmitter 1810 and a DCI transmitter 1820. Here, the processor 1800 may correspond to the processor to be described later (or described above).

The configuration information transmitter 1610 may be configured to control the transceiver to transmit dormant BWP configuration information to a UE. Here, the dormant BWP configuration information may be information about a DL BWP used as dormant BWP among at least one DL BWP configured for the UE. Since specific examples of the above embodiments are the same as described above, in order to avoid unnecessary repetition, descriptions of overlapping contents will be omitted.

The DCI transmitter 1620 may be configured to control the transceiver to transmit DCI notifying activation of the dormant BWP to the UE. Here, the BWP inactivity timer is not used based on the activation of the dormant BWP, and the BWP inactivity timer may be a timer for a transition to a default BWP. Since specific examples of the above embodiments are the same as described above, in order to avoid unnecessary repetition, descriptions of overlapping contents will be omitted.

Figure 19:
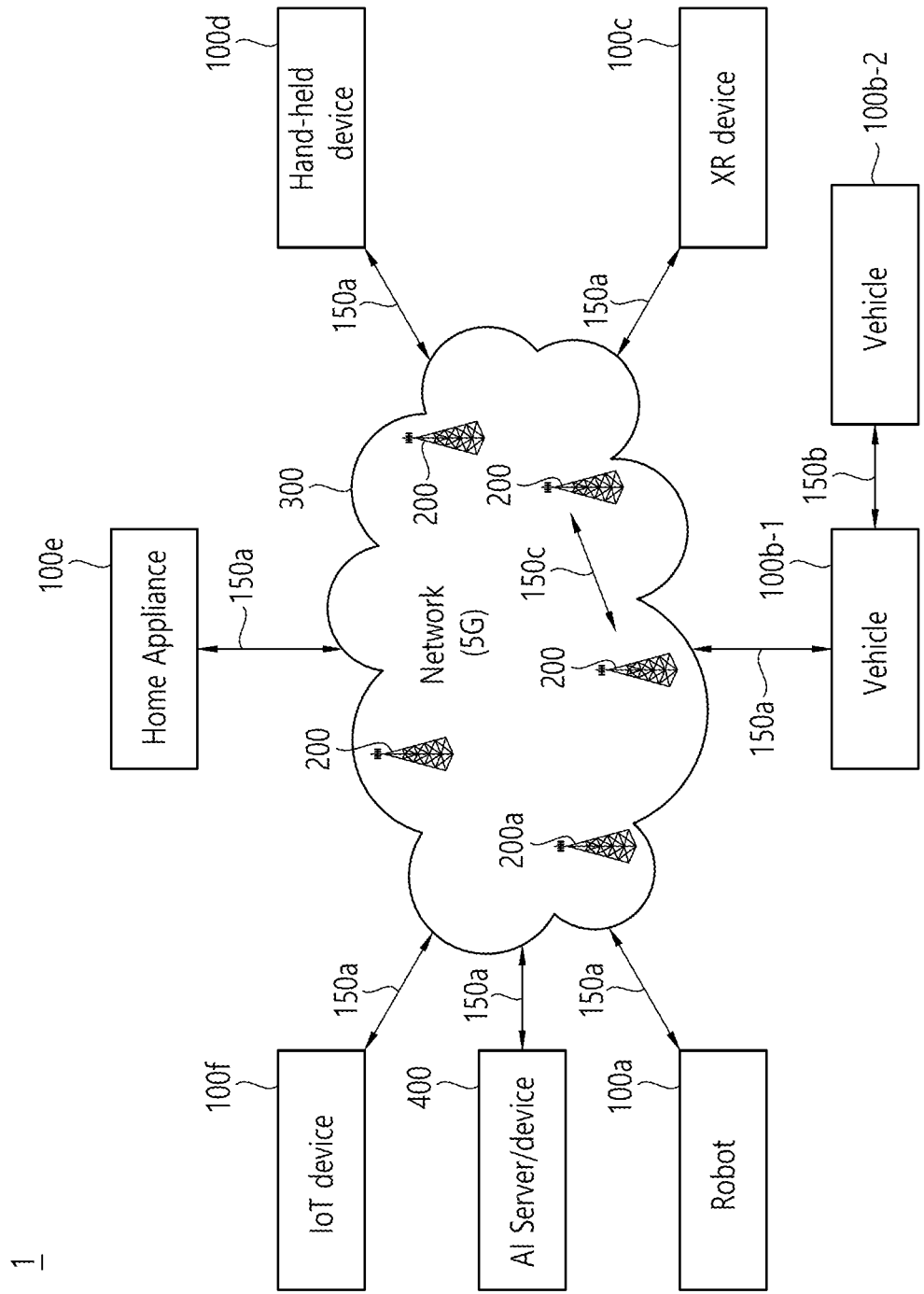
FIG. 19 illustrates a communication system 1 applied to the disclosure.

FIG. 19 illustrates a communication system 1 applied to the disclosure.

Referring to FIG. 19, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/

5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee. Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (TAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Meanwhile, NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 4. For convenience of description, FR1 of the frequency ranges used for an NR system may refer to a "sub 6 GHz range", and FR2 may refer to an "above 6 GHz range" and may be referred to as a millimeter wave (mmW).

TABLE 4

| Frequency range designation | Corresponding frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As Illustrated above, the values of the frequency ranges or the NR system may be changed. For example, FR1 may include a band from 410 MHz to 7125 MHz as shown in Table 5. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 5

| Frequency range designation | Corresponding frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Figure 20:
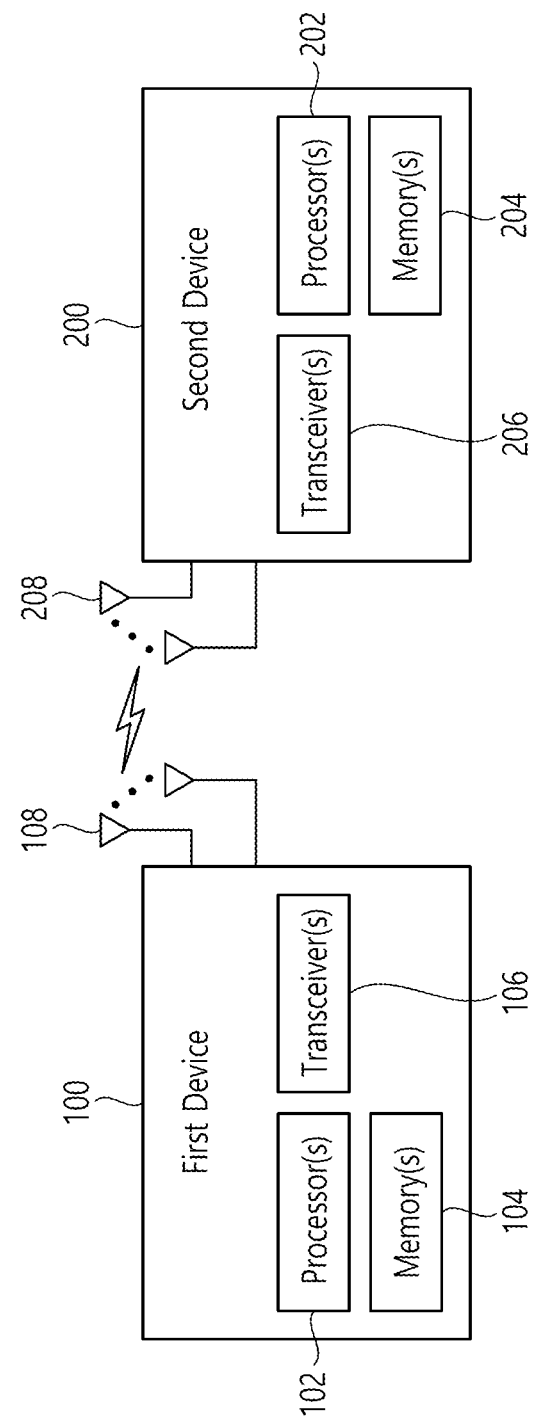
FIG. 20 illustrates a wireless device that is applicable to the disclosure.

Hereinafter, an example of a wireless device to which the disclosure is applied is described. FIG. 20 illustrates a wireless device that is applicable to the disclosure.

Referring to FIG. 20, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 19 and/or may respectively correspond to a wireless device 100x and a wireless device 100x of FIG. 19.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106) and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 21:
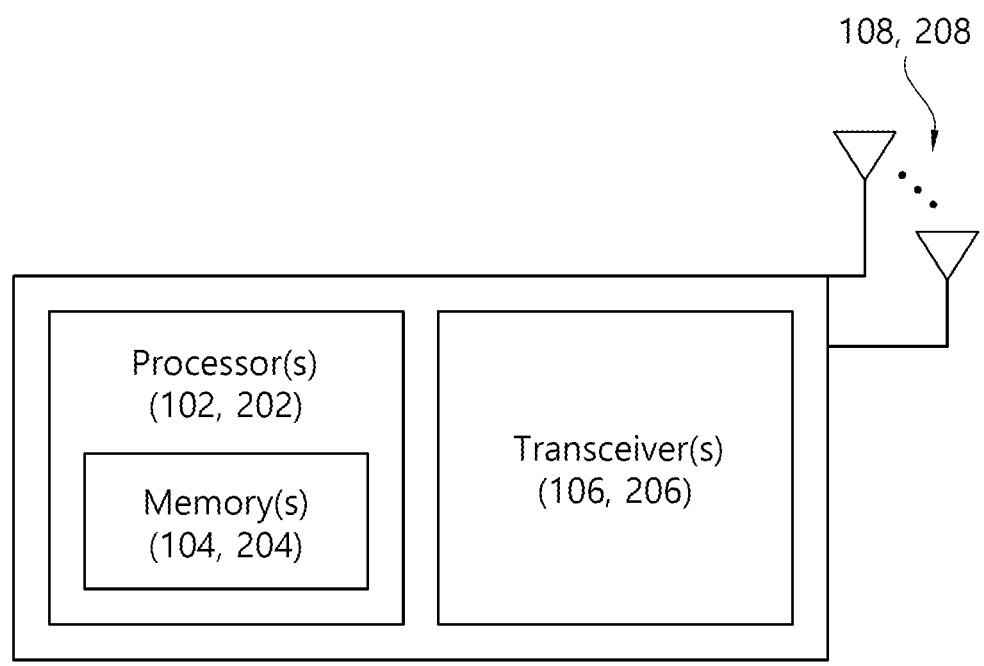
FIG. 21 illustrates another example of a wireless device applicable to the present disclosure.

FIG. 21 illustrates another example of a w % ireless device applicable to the present disclosure.

Referring to FIG. 21, a wireless device may include at least one processor 102, 202, at least one memory 104, 204, at least one transceiver 106, 206, and one or more antennas 108, 208.

As a difference between the example of the wireless device described above in FIG. 20 and the example of the wireless device in FIG. 21, the processors 102 and 202 and the memories 104 and 204 are separated in FIG. 20, and the processors 102 and 202 include the memories 104 and 204 in FIG. 21.

Here, the specific description of the processor 102, 202, the memory 104, 204, the transceiver 106, 206, and one or more antennas 108, 208 is same as described above, repeated descriptions will be omitted in order to avoid unnecessary repetition of descriptions.

Hereinafter, an example of a signal processing circuit to which the disclosure is applied is described.

Figure 22:
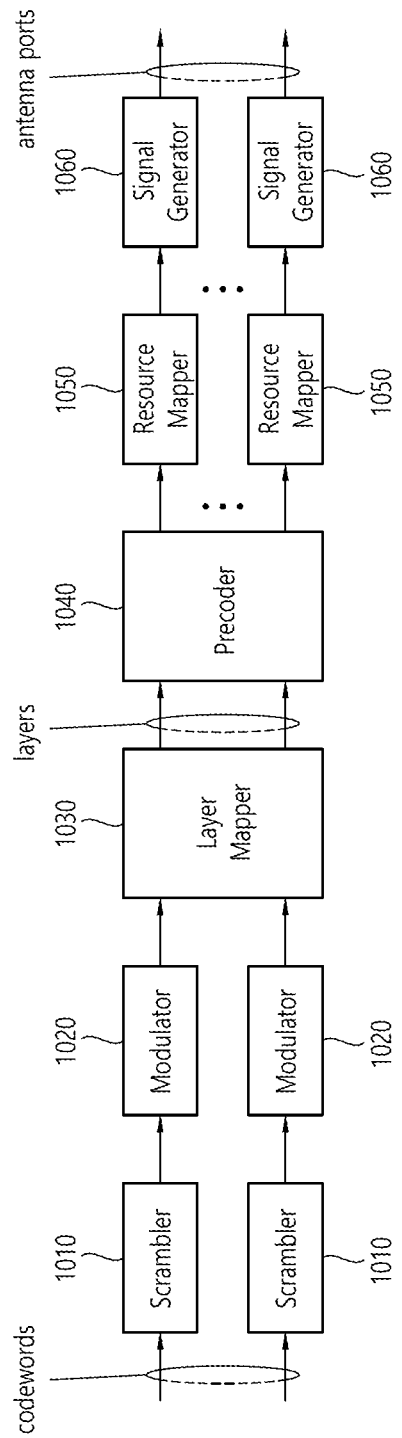
FIG. 22 illustrates a signal processing circuit for a transmission signal.

FIG. 22 illustrates a signal processing circuit for a transmission signal.

Referring to FIG. 22, the signal processing circuit 1000 may include a scrambler 1010, a modulator 1020, a layer mapper 1030, a precoder 1040, a resource mapper 1050, and a signal generator 1060. Operations/functions illustrated with reference to FIG. 22 may be performed, but not limited to, in the processor 102 and 202 and/or the transceiver 106 and 206 of FIG. 20. Hardware elements illustrated in FIG. 22 may be configured in the processor 102 and 202 and/or the transceiver 106 and 206 of FIG. 20. For example, blocks 1010 to 1060 may be configured in the processor 102 and 202 of FIG. 20. Alternatively, blocks 1010 to 1050 may be configured in the processor 102 and 202 of FIG. 20, and a block 1060 may be configured in the transceiver 106 and 206 of FIG. 20.

A codeword may be converted into a radio signal via the signal processing circuit 1000 of FIG. 22. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 22. For example, a wireless device (e.g., 100 and 200 of FIG. 20) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Hereinafter, an example of utilizing a wireless device to which the disclosure is applied is described.

Figure 23:
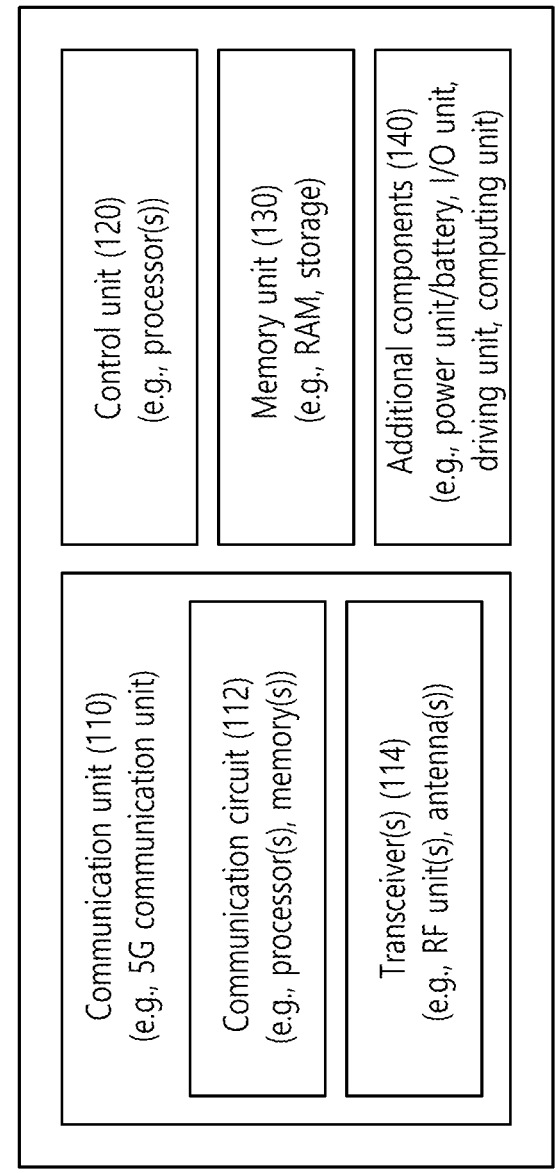
FIG. 23 illustrates another example of a wireless device applied to the disclosure.

FIG. 23 illustrates another example of a wireless device applied to the disclosure. The wireless device may be configured in various forms depending on usage/service.

Referring to FIG. 23, the wireless devices 100 and 200 may correspond to the wireless device 100 and 200) of FIG. 20 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 20. For example, the transceiver(s) 114 may include the at least one transceiver 106 and 206 and/or the at least one antenna 108 and 208 of FIG. 20. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 19), a vehicle (100b-1 or 100b-2 in FIG. 19), an XR device (100c in FIG. 19), a hand-held device (100d in FIG. 19), a home appliance (100e in FIG. 19), an IoT device (100f in FIG. 19), a terminal for digital broadcasting, a hologram device, a public safety device, an MTC device, a medical device, a fintech device (or financial device), a security device, a climate/environmental device, an AI server/device (400 in FIG. 19), a base station (200 in FIG. 19), a network node, or the like. The wireless device may be mobile or may be used in a fixed place depending on usage/service.

In FIG. 23, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 23 is described in detail with reference to the accompanying drawing.

Figure 24:
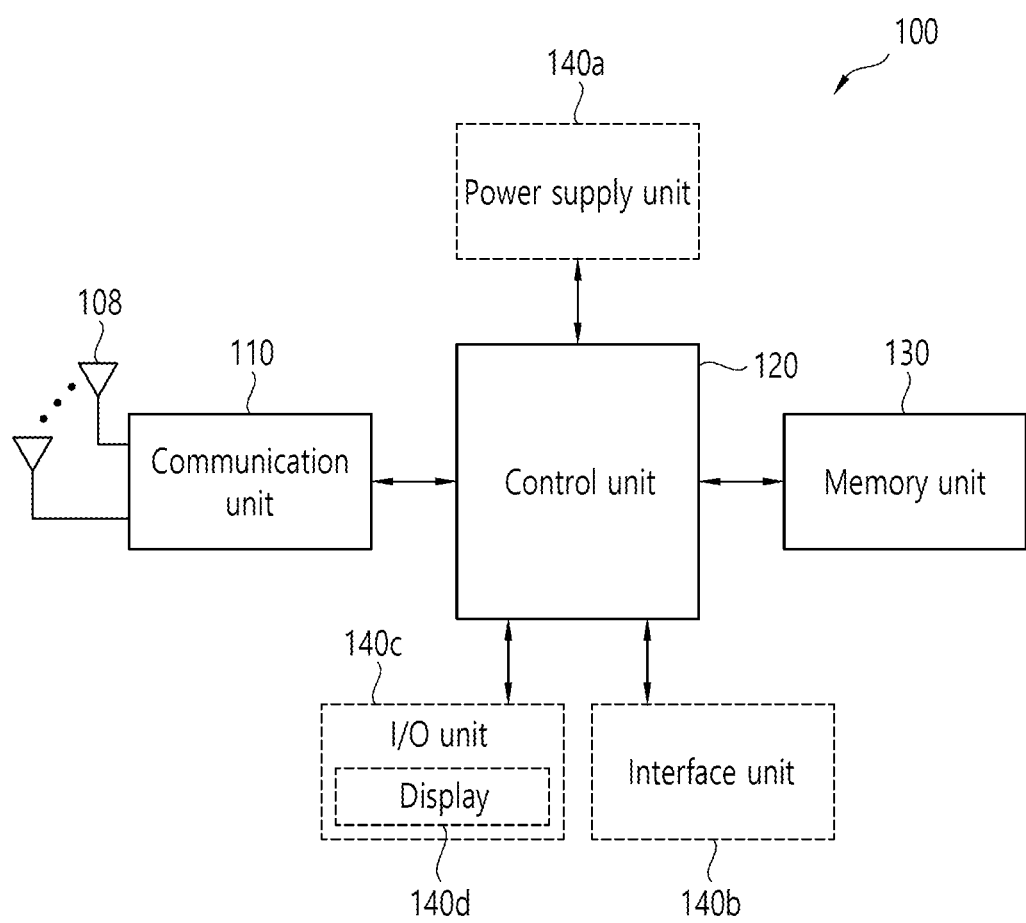
FIG. 24 illustrates a hand-held device applied to the disclosure.

FIG. 24 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 24, the hand-held device 100 may include an antenna unit 108, a communication unit 110, a control unit 120, a memory unit 130, a power supply unit 140a, an interface unit 140b, and an input/output unit 140c. The antenna unit 108 may be configured as a pan of the communication unit 110. Blocks 110 to 130/140a to 140c correspond to the blocks 110 to 130/140 in FIG. 23, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

FIG. 25 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 25, the vehicle or the autonomous driving vehicle 100 may include an antenna unit 108, a communication unit 110, a control unit 120, a driving unit 140a, a power supply unit 140b, a sensor unit 140c, and an autonomous driving unit 140*d*. The antenna unit 108 may be configured as a part of the communication unit 110. Blocks 110/130/140*a* to 140*d* correspond to the blocks 110/130/140 in FIG. 23, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140*a* may enable the vehicle or the autonomous driving vehicle 100 to run on the ground. The driving unit 140*a* may include an engine, a motor, a power train, wheels, a brake, a steering device, and the like. The power supply unit 140*b* supplies power to the vehicle or the autonomous driving vehicle 100 and may include a wired/wireless charging circuit, a battery, and the like. The sensor unit 140*c* may obtain a vehicle condition, environmental information, user information, and the like. The sensor unit 140*c* may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140*d* may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140*d* may generate an autonomous driving route and a driving plan on the basis of obtained data. The control unit 120 may control the driving unit 140*a* to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140*c* may obtain a vehicle condition and environmental information. The autonomous driving unit 140*d* may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. A method of receiving dormant bandwidth part (BWP) configuration information in a wireless communication system, the method being performed by a user equipment (UE) and comprising:
   receiving, from a base station, the dormant BWP configuration information through a radio resource control (RRC) message, wherein the dormant BWP configuration information includes information related to a downlink BWP to be used as dormant BWP among at least one downlink BWP configured for the UE;
   receiving, from the base station, first downlink control information (DCI), wherein an activation of the dormant BWP is determined based on the first DCI;
   stopping monitoring of a physical downlink control channel (PDCCH) on the dormant BWP based on the determination of the activation of the dormant BWP; and
   receiving, from the base station, second DCI,
   wherein an activation of a specific BWP which is different from the dormant BWP is determined based on the second DCI, and
   wherein a BWP inactivity timer is not used for transitioning from the dormant BWP, which is activated, to a default BWP.

2. The method of claim 1, wherein a maximum number of the at least one downlink BWP is 4.

3. The method of claim 1, wherein the default BWP is a BWP to which the UE transitions when the BWP inactivity timer expires.

4. The method of claim 1, wherein the dormant BWP is a BWP different from the default BWP.

5. The method of claim 1, wherein a field for scheduling the PDSCH reception included in the DCI is configured as a known bit.

6. The method of claim 1, wherein the dormant BWP is activated, and based on running of the BWP inactivity timer, the UE stops the BWP inactivity timer.

7. The method of claim 1, wherein the UE stops the BWP inactivity timer without a transition to the default BWP based on a release of the BWP inactivity timer.

8. The method of claim 1, wherein the at least one downlink BWP is a downlink BWP for a secondary cell (SCell).

9. The method of claim 8, wherein the at least one downlink BWP includes the dormant BWP.

10. The method of claim 9, wherein the at least one downlink BWP includes the default BWP.

11. A user equipment (UE) comprising:
    a transceiver;
    at least one memory; and
    at least one processor being operatively connected to the at least one memory and the transceiver,
    wherein the at least one processor is configured to:
    control the transceiver to receive, from a base station, dormant bandwidth part (BWP) configuration information through a radio resource control (RRC) message, wherein the dormant BWP configuration information includes information related to a downlink BWP to be used as dormant BWP among at least one downlink BWP configured for the UE;
    control the transceiver to receive, from the base station, first downlink control information (DCI), wherein an activation of the dormant BWP is determined based on the first DCI;

stop monitoring of a physical downlink control channel (PDCCH) on the dormant BWP based on the determination of the activation of the dormant BWP; and receiving, from the base station, second DCI, wherein an activation of a specific BWP which is different from the dormant BWP is determined based on the second DCI, and wherein a BWP inactivity timer is not used for transitioning from the dormant BWP, which is activated, to a default BWP.

12. An apparatus comprising:

at least one memory; and at least one processor being operatively connected to the at least one memory, wherein the processor is configured to:

control a transceiver to receive, from a base station, dormant bandwidth part (BWP) configuration information through a radio resource control (RRC) message, wherein the dormant BWP configuration information includes information related to a downlink BWP to be used as dormant BWP among at least one downlink BWP configured for the apparatus;

control the transceiver to receive, from the base station, first downlink control information (DCI), wherein an activation of the dormant BWP is determined based on the first DCI;

stop monitoring of a physical downlink control channel (PDCCH) on the dormant BWP based on the determination of the activation of the dormant BWP; and receiving, from the base station, second DCI, wherein an activation of a specific BWP which is different from the dormant BWP is determined based on the second DCI, and wherein a BWP inactivity timer is not used for transitioning from the dormant BWP, which is activated, to a default BWP.

* * * * *